US010521902B2

(12) United States Patent
Avendi et al.

(10) Patent No.: US 10,521,902 B2
(45) Date of Patent: Dec. 31, 2019

(54) AUTOMATED SEGMENTATION OF ORGAN CHAMBERS USING DEEP LEARNING METHODS FROM MEDICAL IMAGING

(71) Applicant: The Regents of the University of California, Oakland, CA (US)

(72) Inventors: Michael Rashidi Avendi, Irvine, CA (US); Hamid Jafarkhani, Irvine, CA (US); Arash Kheradvar, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 72 days.

(21) Appl. No.: 15/294,207

(22) Filed: Oct. 14, 2016

(65) Prior Publication Data

US 2017/0109881 A1 Apr. 20, 2017

Related U.S. Application Data

(60) Provisional application No. 62/241,570, filed on Oct. 14, 2015.

(51) Int. Cl.
*G06T 7/00* (2017.01)
*G06T 3/00* (2006.01)
(Continued)

(52) U.S. Cl.
CPC .......... *G06T 7/0012* (2013.01); *G06T 3/0006* (2013.01); *G06T 7/11* (2017.01);
(Continued)

(58) Field of Classification Search
CPC . G06T 2207/20081; G06T 2207/20124; G06T 2207/30048; G06T 7/149
See application file for complete search history.

(56) References Cited

U.S. PATENT DOCUMENTS

| 6,366,684 | B1 * | 4/2002 | Gerard | G06T 7/0012 382/132 |
|---|---|---|---|---|
| 2003/0035573 | A1 * | 2/2003 | Duta | G06K 9/62 382/128 |

(Continued)

OTHER PUBLICATIONS

Assen, et al. 2006 "SPASM: A 3D-ASM for segmentation of sparse and arbitrarily oriented cardiac MRI data" *Medical Image Analysis* 10(2): 286-303.

(Continued)

*Primary Examiner* — Gandhi Thirugnanam
(74) *Attorney, Agent, or Firm* — Knobbe, Martens, Olson & Bear LLP

(57) ABSTRACT

Systems and methods are disclosed for automatically segmenting a heart chamber from medical images of a patient. The system may include one or more hardware processors configured to: obtain image data including at least a representation of the patient's heart; obtain a region of interest from the image data; organize the region of interest into an input vector; apply the input vector through a trained graph; obtain an output vector representing a refined region of interest corresponding to the heart based on the application of the input vector through the trained graph; apply a deformable model on the obtained output vector representing the refined region of interest; and identify a segment of a heart chamber from the application of the deformable model on the obtained output vector.

14 Claims, 25 Drawing Sheets

(51) Int. Cl.
G06T 7/38 (2017.01)
G06T 7/11 (2017.01)
G06T 7/149 (2017.01)

(52) U.S. Cl.
CPC .............. *G06T 7/149* (2017.01); *G06T 7/38* (2017.01); *G06T 2207/10081* (2013.01); *G06T 2207/10088* (2013.01); *G06T 2207/20081* (2013.01); *G06T 2207/20124* (2013.01); *G06T 2207/30048* (2013.01)

(56) References Cited

U.S. PATENT DOCUMENTS

| | | | |
|---|---|---|---|
| 2004/0013290 A1* | 1/2004 | Krishnan | G06T 5/50 382/128 |
| 2006/0002626 A1* | 1/2006 | Matsumoto | G06T 3/0037 382/276 |
| 2006/0072799 A1* | 4/2006 | McLain | G06T 5/009 382/128 |
| 2007/0014452 A1* | 1/2007 | Suresh | G06F 19/3481 382/128 |
| 2008/0304730 A1* | 12/2008 | Abe | A61B 8/08 382/131 |
| 2010/0195887 A1* | 8/2010 | Abe | A61B 8/08 382/131 |
| 2016/0174902 A1* | 6/2016 | Georgescu | G06T 7/73 600/408 |
| 2017/0109881 A1* | 4/2017 | Avendi | G06T 7/0012 |
| 2018/0144465 A1* | 5/2018 | Hsieh | G06T 7/0012 |
| 2019/0114544 A1* | 4/2019 | Sundaram | G06K 9/6257 |
| 2019/0156477 A1* | 5/2019 | Perrin | G16H 30/20 |
| 2019/0205766 A1* | 7/2019 | Krebs | G06N 3/088 |
| 2019/0223725 A1* | 7/2019 | Lu | A61B 5/0044 |

OTHER PUBLICATIONS

Avendi, et al. 2016 "A combined deep-learning and deformable-model approach to fully automatic segmentation of the left ventricle in cardiac MRI" *Medical Image Analysis* 30: 108-119.
Babalola, et al. 2008 "Comparison and Evaluation of Segmentation Techniques for Subcortical Structures in Brain MRI" *Springier-Verlag Berlin Heidelberg* pp. 409-416.
Bai, et al. 2013 "A Probabilistic Patch-Based Label Fusion Model for Multi-Atlas Segmentation With Registration Refinement: Application to Cardiac MR Images" *IEEE Transactions on Medical Imaging* 32(7): 1302-1315.
Baldi, et al. 2012 "Autoencoders, Unsupervised Learning, and Deep Architectures" *JMLR: Workshop and Conference Proceedings* 27: 37-50.
Barajas, et al. 2006 "Correction of Misalignment Artifacts Among 2-D Cardiac MR Images in 3-D Space" *First International Workshop on Computer Vision for Intravascular and Intracardiac Imaging, MICCAI* 1: 114-121.
Ben Ayed, et al. 2009 "Embedding Overlap Priors in Variational Left Ventricle Tracking" *IEEE Transactions on Medical Imaging* 28(12): 1902-1913.
Bengio, 2009 "Learning Deep Architectures for AI" *Foundations and Trends in Machine Learning* 2(1): 1-127.
Billet, et al. 2009 "Cardiac Motion Recovery and Boundary Conditions Estimation by Coupling an Electromechanical Model and Cine-MRI Data" *Springer-Verlag Berlin Heidelberg* 5528: 376-385.
Bonnemains, et al. 2012 "Assessment of Right Ventricle volumes and Function by Cardiac MRI: Quantification of the Regional and Global Interobserver Variability" *Magnetic Resonance in Medicine* 67(6): 1740-1746.
Carminati, et al. 2014 "Nearly automated motion artifacts correction between multi breath-hold short-axis and long-axis cine CMR images" *Computers in Biology and Medicine* 46: 42-50.
Caudron, et al. 2011 "Diagnostic accuracy and variability of three semi-quantitative methods for assessing right ventricular systolic function from cardiac MRI in patients with acquired heart disease" *European Radiology* 21(10): 2111-2120.
Caudron, et al. 2012 "Cardiac MRI Assessment of Right Ventricular Function in Acquired Heart Disease: Factors of Variability" *Academic Radiology* 19(8): 991-1002.
Chan, et al. 2001 "Active Contours Without Edges" *IEEE Transactions on Image Processing* 10(2): 266-277.
Chandler, et al. 2008 "Correction of misaligned slices in multi-slice cardiovascular magnetic resonance using slice-to-volume registration" *Journal of Cardiovascular Magnetic Resonance* 10(13): 1-9.
Chang, et al. 2010 "Active Shape Modeling with Electric Flows" *IEEE Transactions on Visualization and Computer Graphics* 16(5): 854-869.
Cobzas, et al. 2009 "Increased Discrimination in Level Set Methods with Embedded Conditional Random Fields" *Proceedings of IEEE Conference on Computer Vision and Pattern Recognition* pp. 328-335.
Cocosco, et al. 2008 "Automatic Image-Driven Segmentation of the Ventricles in Cardiac Cine MRI" *Journal of Magnetic Resonance Imaging* 28(2): 366-374.
Cordero-Grande, et al. 2011 "Unsupervised 4D myocardium segmentation with a Markov Random Field based deformable model" *Medical Image Analysis* 15(3): 283-301.
Deng, et al. 2014 "Deep Learning: Methods and Applications" *Foundations and Trends in Signal Processing* 7(3-4): 197-387.
Dreijer, et al. 2013 "Left ventricular segmentation from MRI datasets with edge modelling conditional random fields" *BMC Medical Imaging* 13(1): 1-23.
Eslami, et al. 2013 "Segmentation by retrieval with guided random walks: Application to left ventricle segmentation in MRI" *Medical Image Analysis* 17(2): 236-253.
Frangi, et al. 2001 "Three-Dimensional Modeling for Functional Analysis of Cardiac Images: A Review" *IEEE Transactions on Medical Imaging* 20(1): 2-5.
Geremia, et al. 2011 "Spatial decision forests for MS lesion segmentation in multi-channel magnetic resonance images" *NeuroImage* 57(2): 378-390.
Geva, 2014 "Is MRI the Preferred Method for Evaluating Right Ventricular Size and Function in Patients With Congenital Heart Disease?" *Circ Cardiovasc Imaging* 7(1): 190-197.
Grosgeorge, et al. 2013 "Graph cut segmentation with a statistical shape model in cardiac MRI" *Computer Vision and Image Understanding* 117(9): 1027-1035.
Haddad, et al. 2008 "Right Ventricular Function in Cardiovascular Disease, Part II—Pathophysiology, Clinical Importance, and Management of Right Ventricular Failure" *Circulation* 117(13): 1717-1731.
Heimann, et al. 2009 "Statistical shape models for 3D medical image segmentation: A review" *Medical Image Analysis* 13(4): 543-563.
Hinton, et al. 2006 "Reducing the Dimensionality of Data with Neural Networks" *Science Magazine* 313(5786): 504-507.
Huang, et al. 2004 "A Graphical Model Framework for Coupling MRFs and Deformable Models" *IEEE Computer Society Conference on Computer Vision and Pattern Recognition* 1063-6919: 1-8.
Jolly, 2009 "Fully Automatic Left Ventricle Segmentation in Cardiac Cine MR Images Using Registration and Minimum Surfaces" *Siemens Corporate Research* 4: 1-8.
Jolly, et al. 2009 "Combining Registration and Minimum Surfaces for the Segmentation of the Left Ventricle in Cardiac Cine MR Images" *Springer-Verlag Berlin Heidelberg* 5762: 910-918.
Kedenburg, et al. 2006 "Automatic cardiac MRI myocardium segmentation using graphcut" *International Society for Optics and Photonics* 6144: 61440A-1-61440A-12.
Kevin, et al. 2007 "Right ventricular failure" *Continuing Education in Anesthesia, Critical Care & Pain* 7(3): 89-94.
Koikkalainen, et al. 2008 "Methods of Artificial Enlargement of the Training Set for Statistical Shape Models" *IEEE Transactions on Medical Imaging* 27(11): 1643-1654.
Krizhevsky, et al. 2012 "ImageNet Classification with Deep Convolutional Neural Networks" pp. 1-9.
Kullback, et al. 1951 "On Information and Sufficiency" *The Annals of Mathematical Statistics* 22(1): 79-86.

(56) References Cited

OTHER PUBLICATIONS

Lecun, et al. 2010 "Convolutional Networks and Applications in Vision" *Courant Institute of mathematical Sciences* pp. 253-256.

Lecun, et al. 2015 "Deep Learning" *Nature* 521(7553): 436-444.

Lempitsky, et al. 2009 "Random Forest Classification for Automatic Delineation of Myocardium in Real-Time 3D Echocardiography" *Springer-Verlag Berlin Heidelberg* 5528: 447-456.

Liew, et al. 2015 "Motion corrected LV quantification based on 3D modelling for improved functional assessment in cardiac MRI" *Institute of Physics and Engineering in Medicine* 60(7): 2715-2733.

Lima, et al. 2004 "Cardiovascular Magnetic Resonance Imaging: Current and Emerging Applications" *Journal of the American College of Cardiology* 44(1): 1164-1171.

Liu, 2012 "Automatic Left Ventricle Segmentation in Cardiac MRI Using Topological Stable-State Thresholding and Region Restricted Dynamic Programming" *Academic Radiology* 19(6): 723-731.

Lorenzo-Valdes, et al. 2004 "Segmentation of 4D cardiac MR images using a probabilistic atlas and the EM algorithm" *Medical Image Analysis* 8(3): 255-265.

Lötjönen, et al. 2004 "Correction of Movement Artifacts from 4-D Cardiac Short- and Long-Axis MR Data" *Springer-Verlag Berlin Heidelberg* pp. 405-412.

Lu, et al. 2011 "Automatic Delineation of Left and Right Ventricles in Cardiac MRI Sequences Using a Joint Ventricular Model" *Springer-Verlag Berlin Heidelberg* 6666(3): 250-258.

Mahapatra, et al. 2013 "Automatic Cardiac RV Segmentation Using Semantic Information with Graph Cuts" *IEEE 10th International Symposium on Biomedical Imaging: From Nano to Macro* pp. 1106-1109.

Mahapatra, et al. 2014 "Automatic Cardiac Segmentation Using Semantic Information from Random Forests" *Journal of Digital Imaging* 27(6): 794-804.

Maier, et al. 2012 "Segmentation of RV in 4D Cardiac MR Volumes using Region-Merging Graph Cuts" *Computing in Cardiology* 39: 697-700.

Margeta, et al. 2012 "Layered Spatio-temporal Forests for Left Ventricle Segmentation from 4D Cardiac MRI Data" *Springer-Verlag Berlin Heidelberg* 7085: 109-119.

Mehta, et al. 2001 "Impact of Right Ventricular Involvement on Mortality and Morbidity in Patients With Inferior Myocardial Infarction" *Journal of the American College of Cardiology* 37(1): 37-43.

Moolan-Feroze, et al. 2014 "Segmentation of the Right Ventricle Using Diffusion Maps and Markov Random Fields" *Springer International Publishing Switzerland* 8673: 682-689.

Ngo, et al. 2014 "Fully Automated Non-rigid Segmentation with Distance Regularized Level Set Evolution Initialized and constrained by Deep-structured Inference" *IEEE Conference on Computer Vision and Pattern Recognition (CVPR)* 1063-6919: 3118-3125.

Ou, et al. 2012 "Multi-Atlas Segmentation of the Cardiac MR Right Ventricle" *Proceedings of 3D Cardiovascular Imaging: A MICCAI Segmentation Challenge* pp. 1-6.

Petitjean, et al. 2011 "A review of segmentation methods in short axis cardiac MR images" *Medical Image Analysis* 15(2): 169-184.

Petitjean, et al. 2015 "Right ventricle segmentation from cardiac MRI: A collation study" *Medical Image Analysis* 19(1): 187-202.

Pluempitiwiriyawej, et al. 2005 "STACS: New Active Contour Scheme for Cardiac MR Image Segmentation" *IEEE Transactions on Medical Imaging* 24(5): 593-603.

Queiros, et al. 2014 "Fast automatic myocardial segmentation in 4D cine CMR datasets" *Medical Image Analysis* 18(7): 1115-1131.

Radau, et al. 2009 "Cardiac MR Left Ventricle Segmentation Challenge" *Cardiac MR Left Ventricle Segmentation Challenge* pp. 1-7.

Ringenberg, et al. 2014 "Fast, accurate, and fully automatic segmentation of the right ventricle in short-axis cardiac MRI" *Computerized Medical Imaging and Graphics* 38(3): 190-201.

Rumelhart, et al. 1986 "Learning representations by back-propagating errors" *Nature* 323: 533-536.

Sermanet, et al. 2014 "OverFeat: Integrated Recognition, Localization and Detection using Convolutional Networks" *Courant Institute of Mathematical Sciences* pp. 1-16.

Suinesiaputra, et al. 2014 "A collaborative resource to build consensus for automated left ventricular segmentation of cardiac MR images" *Medical Image Analysis* 18(1): 50-62.

Szegedy, et al. 2013 "Deep Natural Networks for Object Detection" 26: 1-9.

Tavakoli, et al. 2013 "A survey of shaped-based registration and segmentation techniques for cardiac images" *Computer Vision and Image Understanding* 117(9): 966-989.

Vincent, et al. 2010 "Stacked Denoising Autoencoders: Learning Useful Representations in a Deep Network with a Local Denoising Criterion" *Journal of Machine Learning Research* 11: 3371-3408.

Vitarelli, et al. 2010 "Do we have two hearts? New insights in right ventricular function supported by myocardial imaging echocardiography" *Heart Failure Reviews* 15(1): 39-61.

Yuan, et al. 2002 "Contrast-Enhanced High Resolution MRI for Atherosclerotic Carotid Artery Tissue Characterization" *Journal of Magnetic Resonance Imaging* 15(1): 62-67.

Zakkaroff, et al. 2012 "Stack Alignment and Transform for Misalignment Correction in Cardiac MR Cine Series" pp. 1-7.

Zhang, et al. 2010 "4-D Cardiac MR Image Analysis: Left and Right Ventricular Morphology and Function" *IEEE Transactions on Medical Imaging* 29(2): 350-364.

Zhuang, et al. 2008 "Robust registration between cardiac MRI images and atlas for segmentation propagation" *International Society for Optics and Photonics* 6914: 691408-1-691408-11.

Zuluaga, et al. 2013 "Multi-atlas Propagation Whole Heart Segmentation from MRI and CTA Using a Local Normalised Correlation Coefficient Criterion" *Functional Imaging and Modeling of the Heart* 7945: 174-181.

\* cited by examiner

AUTOMATED SEGMENTATION OF ORGAN CHAMBERS USING DEEP LEARNING METHODS FROM MEDICAL IMAGING

BACKGROUND

Field

The invention relates to image segmentation devices and related methods of automatically segmenting organ chambers using deep learning methods to compute clinical indices from imaging data.

Description of the Related Art

Cardiac magnetic resonance imaging (MRI) is now routinely being used for the evaluation of the function and structure of the cardiovascular system (Yuan, C. et al. 2002 *J Magn Reson Imaging* 15(1): 62-67; Lima, J. C. and Desai, M. Y. 2004. *J Am Coll Cardiol* 44(1): 1164-1171; Frangi, A. F. et al. 2001 *IEEE Trans Med Imag* 20(1): 2-5; Petitjean, C. and Dacher, J.-N. 2011 *Med Image Anal* 15(2): 169-184; Tavakoli, V. and Amini, A. A. 2013 *Comput Vis Image Underst* 117(9); 966-989; Heimann, T. and Meinzer, H.-P. 2009 *Med Image Anal* 13(4): 543-563; Suinesiaputra, A. et al. 2014 *Med Image Anal* 18(1): 50-62). Segmentation of the left ventricle (LV) from cardiac MRI datasets is an essential step for calculation of clinical indices such as ventricular volume, ejection fraction, left ventricular mass and wall thickness as well as analyses of the wall motion abnormalities.

Manual delineation by experts is currently the standard clinical practice for performing the LV segmentation. However, manual segmentation is tedious, time consuming and prone to intra- and inter-observer variability (Frangi, A. F. et al. 2001 *IEEE Trans Med Imag* 20(1): 2-5; Petitjean, C. and Dacher, J.-N. 2011 *Med Image Anal* 15(2): 169-184; Tavakoli, V. and Amini, A. A. 2013 *Comput Vis Image Underst* 117(9); 966-989; Heimann, T. and Meinzer, H.-P. 2009 *Med Image Anal* 13(4): 543-563; Suinesiaputra, A. et al. 2014 *Med Image Anal* 18(1): 50-62). To address this, it is necessary to reproducibly automate this task to accelerate and facilitate the process of diagnosis and follow-up. To date, several methods have been proposed for the automatic segmentation of the LV. A review of these methods can be found in Frangi, A. F. et al. 2001 *IEEE Trans Med Imag* 20(1): 2-5; Petitjean, C. and Dacher, J.-N. 2011 *Med Image Anal* 15(2): 169-184; Tavakoli, V. and Amini, A. A. 2013 *Comput Vis Image Underst* 117(9); 966-989; Heimann, T. and Meinzer, H.-P. 2009 *Med Image Anal* 13(4): 543-563; Suinesiaputra, A. et al. 2014 *Med Image Anal* 18(1): 50-62.

To summarize, there are several challenges in the automated LV segmentation from cardiac MRI datasets: heterogeneities in the brightness of LV cavity due to blood flow; presence of papillary muscles with signal intensities similar to that of the myocardium; complexity in segmenting the apical and basal slice images; partial volume effects in apical slices due to the limited resolution of cardiac MRI; inherent noise associated with cine cardiac MRI; dynamic motion of the heart and inhomogeneity of intensity; considerable variability in shape and intensity of the heart chambers across patients, notably in pathological cases, etc. (Tavakoli, V. and Amini, A. A. 2013 *Comput Vis Image Underst* 117(9); 966-989; Petitjean, C. and Dacher, J.-N. 2011 *Med Image Anal* 15(2): 169-184; Queiros, S. et al. 2014 *Med Image Anal* 18(7): 1115-1131). Due to these technical barriers, the task of automatic segmentation of the heart chambers from cardiac MRI is still a challenging problem (Petitjean, C. and Dacher, J.-N. 2011 *Med Image Anal* 15(2): 169-184; Tavakoli, V. and Amini, A. A. 2013 *Comput Vis Image Underst* 117(9); 966-989; Suinesiaputra, A. et al. 2014 *Med Image Anal* 18(1): 50-62).

Current approaches for automatic segmentation of the heart chambers can be generally classified as: pixel classification (Kedenburg, G. et al. 2006 in *Automatic Cardiac MRI Myocardium Segmentation Using Graphcut*. International Society for Optics and Photonics, p. 61440A; Cocosco, C. A. et al. 2008 *J Magn Reson Imaging* 28(2): 366-374), image-based methods (Jolly, M., 2009 *MIDAS J.—Cardiac MR Left Ventricle Segm Chall* 4; Liu, H. 2012 *Academic Radiology* 19(6): 723-731), deformable methods (Billet, F. et al. 2009 *Funct Imaging Model Heart* 376-385; Ben Ayed, I. et al. 2009 *IEEE Trans Med Imaging* 28(12): 1902-1913; Chang, H.-H. et al. 2010 *IEEE Trans Vis Comp Gr* 16(5): 854-869; Pluempitiwiriyawej, C. et al. 2005 *IEEE Trans Med Img* 24(5): 593-603), active appearance and shape models (AAM/ASM) (Zhang, H. et al. 2010 *IEEE Trans Med Img* 29(2): 350-364; Assen, H. C. et al. 2006 *Med Image Anal* 10(2): 286-303) and atlas models (Zhuang, X. et al. 2008 Robust Registration Between Cardiac MRI Images and Atlas for Segmentation Propagation. International Society for Optics and Photonics, p. 691408; Lorenzo-Valdés, M. et al. 2004 *Med Image Anal* 8(3): 255-265). Pixel classification, image-based and deformable methods suffer from a low robustness and accuracy and require extensive user interaction (Petitjean, C. and Dacher, J.-N. 2011 *Med Image Anal* 15(2): 169-184). Alternatively, model-based methods such as AAM/ASM and atlas models can overcome the problems related to the previous methods and reduce user interaction at the expense of a large training set to build a general model. However, it is very difficult to build a model that is general enough to cover all possible shapes and dynamics of the heart chambers (Petitjean, C. and Dacher, J.-N. 2011 *Med Image Anal* 15(2): 169-184; Jolly, M. et al. 2009 in *Combining Registration and Minimum Surfaces for the Segmentation of the Left Ventricle in Cardiac Cine MR Images*, vol. 5762. Springer Berlin Heidelberg, pp. 910-918). Small datasets lead to a large bias in the segmentation, which makes these methods inefficient when the heart shape is outside the learning set (e.g., congenital heart defects, post-surgical remodeling, etc.).

Furthermore, current learning-based approaches for LV segmentation have certain limitations. For instance, methods using random forests (Margeta, J. et al. 2012. *Stat Atlases Comput Models Heart Imaging Model. Chall* 109-119; Lempitsky, V. et al. 2009 *Funct Imaging Model Heart* 447-456; Geremia, E. et al. 2011 *NeuroImage* 57(2): 378-390) rely on image intensity and define the segmentation problem as a classification task. These methods employ multiple stages of intensity standardization, estimation and normalization, which are computationally expensive and affect the success of further steps. As such, their performance is rather mediocre at basal and apical slices and overall inferior to the state-of-the-art. Also, methods that use Markov random fields (MRFs) (Cordero-Grande, L., et al. 2011 *Med Image Anal* 15(3): 283-301; Huang, R. et al. 2004 *Proceedings of the 2004 IEEE Computer Society Conference on Computer Vision and Pattern Recognition* CVPR 2004, 2, pp. 11-739), conditional random fields (CRFs) (Cobzas, D. and Schmidt, M. 2009 In: *Proceedings of IEEE Conference on Computer Vision and Pattern Recognition*, CVPR 2009, pp. 328-335; Dreijer, J. et al. 2013 *BMC Med Imaging* 13 (1). doi: 10.1186/1471-2342-13-24) and restricted Boltzman machines (RBMs) (Ng, A. "The deep learning tutorial. Ngo, T. A., Carneiro, G., 2014. Fully automated non-rigid segmentation with distance regularized level set evolution initialized and constrained by deep-structured inference." The IEEE Conference on Computer Vision and Pattern Recognition (CVPR), 2014, pp. 3118-3125) have been considered. MRF and RBM are generative models that try to learn the probability of input data. Computing the image probability and parameter estimation in generative models is usually difficult and can lead to reduced performance if oversimplified. Besides, they use the Gibbs sampling algorithm for training, which can be slow, become stuck for correlated inputs, and produce different results each time it is run due to its randomized nature. Alternatively, CRF methods try to model the conditional probability of latent variables, instead of the input data. However, they are still computationally difficult, due to complexity of parameter estimation, and their convergence is not guaranteed (Dreijer, J. et al. 2013 *BMC Med Imaging* 13 (1). doi: 10.1186/1471-2342-13-24).

Compared to left ventricle (LV), the study of the right ventricle (RV) is a relatively young field. Although many recent studies have confirmed the prognostic value of RV function in cardiovascular disease, for several years its significance has been underestimated (F. Haddad et al. 2008 *Circulation* 117(13): 1717-1731; J. Sanz et al. 2012 *Cardiology Clinics*, 30(2): 189-203). Understanding the role of RV in the pathophysiology of heart failure traditionally has dawdled behind that of the LV. The RV used to be considered a relatively passive chamber relating the systemic and pulmonary circulation until more recent studies revealed its importance in sustaining the hemodynamic stability and cardiac performance (S. R. Mehta et al. 2001 *Journal of the American College of Cardiology* 37(1):37-43; L. G. Kevin and M. Barnard 2007 *Continuing Education in Anaesthesia, Critical Care & Pain* 7(3):89-94; A. Vitarelli and C. Terzano 2010 *Heart Failure Reviews* 15(1): 39-61).

Cardiac magnetic resonance imaging (MRI) is the preferred method for clinical assessment of the right ventricle (C. Petitjean et al. 2015 *Medical Image Analysis* 19(1): 187-202; C. Yuan, et al. 2002 *Journal of Magnetic Resonance Imaging* 15(1):62-67; J. C. Lima and M. Y. Desai 2004 *Journal of the American College of Cardiology* 44(1): 1164-1171; A. F. Frangi et al. 2001 *IEEE Trans on Med Imaging* 20(1): 2-5; V. Tavakoli and A. A. Amini. 2013 *Computer Vision and Image Understanding* 117(9):966-989; T. Heimann and H.-P. Meinzer et al. 2009 *Medical Image Analysis* 13(4):543-563; T. Geva 2014 *Circ Cardiovasc Imaging* 7(1): 190-197). Currently RV segmentation is manually performed by clinical experts, which is lengthy, tiresome and sensitive to intra and inter-operator variability (C. Petitjean et al. 2015 *Medical Image Analysis* 19(1): 187-202; J. Caudron, J. et al. 2011 *European Radiology* 21(10): 2111-2120, 2011; L. Bonnemains et al. 2012 *Magnetic Resonance in Medicine* 67(6): 1740-1746). Therefore, automating the RV segmentation process turns this tedious practice into a fast procedure. This ensures the results are more accurate and not vulnerable to operator-related variabilities, and eventually accelerates and facilitates the process of diagnosis and follow-up.

There are many challenges for RV segmentation that are mainly attributed to RV anatomy. These can be summarized as: presence of RV trabeculations with signal intensities similar to that of the myocardium, complex crescent shape of the RV, which varies from base to apex, along with inhomogeneity reflected in the apical image slices, and considerable variability in shape and intensity of the RV chamber among subjects, notably in pathological cases (C. Petitjean et al. 2015 *Medical Image Analysis* 19(1): 187-202).

Currently, only limited studies have focused on RV segmentation (C. Petitjean et al. 2015 *Medical Image Analysis* 19(1): 187-202). Atlas-based methods have been considered in some studies (M. A. Zuluaga, et al. 2013 *Functional Imaging and Modeling of the Heart* 7945:174-181; M. A. Zuluaga, et al. 2013 *Functional Imaging and Modeling of the Heart* 7945:174-181; W. Bal, et al. 2013 *IEEE Transactions on Medical Imaging* 32(7): 1302-1315), which require large training datasets and long computational times while their final segmentation may not preserve the mostly regular boundaries of the ground-truth masks (Y. Ou et al. 2012 "Multi-atlas segmentation of the cardiac mr rightventricle" Proceedings of 3D Cardiovascular Imaging: A MICCAI Segmentation Challenge. Nice, France). Nevertheless, it is challenging to build a model general enough to cover all possible RV shapes and dynamics (C. Petitjean and J.-N. Dacher 2011 *Medical Image Analysis* 15(2):169-184). Alternatively, graph-cut-based methods combined with distribution matching (C. Nambakhsh "Rapid automated 3d RVendocardium segmentation in mri via convex relaxation and distribution matching" Proc. MICCAI RV Segmentation Challenge, 2012), shape-prior (D. Grosgeorge et al. *Computer Vision and Image Understanding* 117(9): 1027-1035) and region-merging (O. M. O. Maier, et al. 2012 "Segmentation of RVin 4D cardiac MR volumes using region-merging graph cuts" in *Computing in Cardiology (CinC)*, pages 697-700) were studied for RV segmentation. Overall, these methods suffer from a low robustness and accuracy, and require extensive user interaction. Image-based methods have been considered by Ringenberg et al. (J. Ringenberg, et al. 2014 *Computerized Medical Imaging and Graphics* 38(3): 190-201) and Wang et al. (C. Wang, et al. 2012 "A simple and fully automatic right ventricle segmentation method for 4-dimensional cardiac mr images" Proc. of 3D Cardiovascular Imaging: a MICCAI segmentation challenge, 2012). They showed notable accuracy and processing time improvement over other methods while deformed RV shape and patient movement during the scan are the limitations of their method (J. Ringenberg, et al. 2014 *Computerized Medical Imaging and Graphics* 38(3): 190-201). Current learning based approaches, such as probabilistic boosting trees and random forests, depend on the quality and extent of annotated training data and are computationally expensive (X. Lu, et al. 2011 *Functional Imaging and Modeling of the Heart* 6666(3): 250-258; D. Mahapatra and J. M. Buhmann. Automatic cardiac RV segmentation using semantic information with graph cuts. Biomedical Imaging (ISBI), 2013 IEEE 10th International Symposium on, pages 1106-1109, April 2013; O. Moolan-Feroze et al. 2014 Segmentation of the right ventricle using diffusion maps and markov random fields. In *Medical Image Computing and Computer-Assisted Intervention—MICCAI* 2014, pages 682-689, Springer; D. Mahapatra et al. 2014 *Journal of Digital Imaging* 27(6): 794-804).

SUMMARY

Motivated by the limitations in the prior art, and given the fact that manual segmentation by experts is the ground truth in cardiac MRI, we tackle the complex problem of organ chamber segmentation (e.g., LV and RV segmentation) utilizing a combined deep-learning (LeCun, Y. et al. 2015 *Nature* 521(7553): 436-444; Hinton, G. E. and Salakhutdinov, R. R. 2006. *Science* 313(5786): 504-507; Bengio, Y. 2009 *Trends Mach Learn* 2(1): 1-127; Bengio, Y. et al. 2013 *IEEE Trans Patt Anal Mach Intel* 35(8): 1798-1828; Ng, A. "The deep learning tutorial. Ngo, T. A., Carneiro, G., 2014.

Fully automated non-rigid segmentation with distance regularized level set evolution initialized and constrained by deep-structured inference." The IEEE Conference on Computer Vision and Pattern Recognition (CVPR), 2014, pp. 3118-3125; Deng, L. and Yu, D., 2014 *Foundations and Trends in Signal Processing* 7(3-4): 197-387; Baldi, P., 2012. ICML *Unsuperv Transf Learn* 27: 37-50) and deformable-models approach. We have developed and validated fully automated, accurate and robust segmentation methods from MRI data. Our work is one of the early attempts of employing deep learning algorithms for cardiac MRI segmentation.

It is generally believed that, since current practices of deep learning have been trained on large amounts of data, deep learning cannot be effectively utilized for medical image segmentation due to a lack of training data. However, we show that even with limited amount of training data, using artificial data enlargement, pre-training and careful design, deep learning algorithms can be successfully trained and employed for cardiac MRI segmentation.

We have solved some of the shortcomings of classical deformable models, i.e., shrinkage and leakage and sensitivity to initialization, using our integrated approach. Furthermore, we introduce a new curvature estimation method using quadrature polynomials to correct occasional misalignment between image slices. The framework is tested and validated on the MICCAI database (Radau, P. et al. 2009 *MIDAS J Caridac MR Left Ventricle Segm Chall*).

Disclosed are methods of fully automated segmentation and alignment of organ chamber imaging data (e.g., right and left cardiac ventricles) from imaging data (e.g., cardiac magnetic resonance imaging (MRI) images). The automated methods outperform state of the art methods in terms of accuracy, robustness and computational time.

Some embodiments relate to a system for automatically segmenting a body chamber from medical images of a patient, the system comprising one or more hardware processors configured to:

obtain medical images comprising at least a representation of the body chamber inside the patient;

obtain a region of interest corresponding to the body chamber from each of the medical images;

organize the obtained region of interest into an input vector;

apply the input vector through a trained graph having at least one hidden layer; and obtain an output vector representing a refined region of interest corresponding to the body chamber based on the application of the input vector through the trained graph.

In some embodiments, the hardware processors are configured to apply a deformable model on the obtained output vector representing the region of interest.

In some embodiments, the hardware processors are configured to identify a segment of a body chamber from an output of the trained graph.

In some embodiments, the one or more hardware processors is/are configured to identify and segment a chamber of a heart.

In some embodiments, the chamber of a heart is selected from the group consisting of a left ventricle, a right ventricle, a left atrium and a right atrium.

In some embodiments, the medical images comprise magnetic resonance imaging (MRI), echocardiographic or CT scan data.

In some embodiments, the system is configured to obtain filters using a sparse autoencoder (AE), which acts as a pre-training step.

In some embodiments, the trained graph has two or more hidden layers.

In some embodiments, the system is configured to utilize a training data set to initialize filters randomly to train a convolutional network.

In some embodiments, the filters are convolved with the input medical images to obtain k convolved feature maps of size $m_1 \times m_1$, computed as:

$$ZI[i,j] = k1 = 1 ak2 = 1 aFI[k1,k2]I[i+k1-1, j+k2-1] + b0[I], \quad (1)$$

for $1 \le i, j \le m_1$, $l = 1, \ldots, k$, and $m_1 = m - a + 1$; and wherein $p \times p$ non-overlapping regions in the convolved feature maps are computed as:

$$P_l[i_1, j_1] = \frac{1}{p} \sum_{i=1+(i_1-1)p}^{i_1 p} \sum_{j=1+(j_1-1)p}^{j_1 p} C_l[i,j], \quad (2)$$

for $1 \le i1, j1 \le m_2$, wherein $m_2 = m_1/p$ and p is chosen such that $m_2$ is an integer value.

In some embodiments, the one or more hardware processors is configured to align short-axis images of the heart chamber by performing contour alignment to reduce misalignment between the short-axis images.

In some embodiments, center coordinates of the images are estimated using the following quadratic assumptions for curvature:

$$x_i = a_1 i^2 + b_1 i + c_1 \quad \text{(Equation 17)},$$

$$y_i = a_2 i^2 + b_2 i + c_2 \quad \text{(Equation 18)},$$

wherein $a_1$, $b_1$, $c_1$, $a_2$, $b_2$, $c_2$ are unknown parameters estimated based on minimizing the mean squared error as:

$$\hat{a}_1, \hat{b}_1, \hat{c}_1 = \arg\min_{a_1,b_1,c_1} \sum_{i=1}^{n} (\tilde{x}_i - a_1 i^2 - b_1 i - c_1)^2,$$

$$\hat{a}_2, \hat{b}_2, \hat{c}_2 = \arg\min_{a_2,b_2,c_2} \sum_{i=1}^{n} (\tilde{y}_i - a_2 i^2 - b_2 i - c_2)^2.,$$

wherein, after estimating the unknown parameters, the actual center coordinates are estimated from equations (17) and (18), and wherein the contours are registered, using an affine transformation with linear interpolation, according to the estimated center values to obtain an aligned stack of contours.

In some embodiments, the system comprises one or more elements selected from the group consisting of an operating system, a data input port or reader, an output display device, a keyboard, a transceiver unit, a speaker, and an antenna for wireless communication with other with other devices.

In some embodiments, the system is linked to an additional computing device and/or a network.

In some embodiments, the memory comprises one or more of a dynamic random access memory (DRAM), a static random access memory (SRAM), a flash memory, a hard disk drive, a floppy disk drive and a disk-based memory.

In some embodiments, the system comprises a graphics processing unit (GPU) configured to accelerate computing.

Some embodiments relate to a method of detecting whether or not a body chamber has an abnormal structure comprising:

providing a stack of short-axis images as input to the system according to claim 1, operating the system to:

detect the body chamber in the images using deep convolutional networks trained to locate the body chamber, infer a shape of the body chamber using a stacked auto-encoder trained to delineate the body chamber, incorporate the inferred shape into a deformable model for segmentation, and detecting whether or not the body chamber has an abnormal structure, wherein an abnormal structure is indicated by a body chamber clinical indicia that is different from a corresponding known standard clinical indicia for the body chamber.

In some embodiments, the method further comprises performing contour alignment to reduce misalignment between multiple short-axis medical images.

In some embodiments, the clinical indicia is selected from the group consisting of: a volume of the body chamber, an ejection fraction, a mass of the body chamber or a chamber's wall thickness of the body chamber.

Some embodiments relate to a method of detecting whether a body chamber exhibits an abnormal functional motion comprising:

providing a stack of short-axis medical images as input to the system according to claim 1, operating the system to:

detect the body chamber in the images using deep convolutional networks trained to locate the body chamber, infer a shape of a body chamber using a stacked auto-encoder trained to delineate the body chamber, incorporate the inferred shape into a deformable model for segmentation, and align stack images of the body chamber by performing contour alignment to reduce misalignment between the short-axis images; and measuring clinical indicia at two time points, and detecting whether the body chamber shows an abnormal functional motion, wherein an abnormal functional motion is indicated by an abnormal change in the clinical indicia.

In some embodiments, the clinical indicia measured is selected from the group consisting of a volume of a heart chamber, an ejection fraction, a mass of a heart chamber and a wall thickness of a heart chamber.

Some embodiments relate to a method for automatically segmenting a body chamber from medical images of a patient, the method comprising one or more processes to:

obtain image data representing the medical images comprising at least a representation of a body chamber inside the body;

obtain a region of interest corresponding to the body chamber such as but not limited to the heart from the image data;

organize the obtained region of interest into an input vector;

apply the input vector through a trained graph having at least one hidden layer;

obtain an output vector representing a refined region of interest corresponding to the body chamber based on the application of the input vector through the trained graph;

apply a deformable model on the obtained output vector representing the refined region of interest; and identify a segment of a body chamber from the application of the deformable model on the obtained output vector.

DETAILED DESCRIPTION

The systems and processes of automated segmentation disclosed herein employ complex data processing methods of deep-learning and the use of deformable models. Compared to manual methods of image delineation by medical practitioners, the specific components and steps utilized by the systems and methods described here provide significant improvements in the ability to rapidly and accurately segment organ chambers, such as heart chambers in imaging data. Due to the complexity of the steps undertaken by the automated deep learning methods, combined with deformable models, the system disclosed herein and the automated methods employed outperform state of the art methods in terms of accuracy, robustness and computational time.

The image segmentation system (ISS) disclosed herein utilizes complex processes of deep-learning and deformable models to accurately segment organ chambers in imaging data, such as in MRI image stack data. In particular, the ISS receives input data, automatically detects a region of interest (ROI), infers the shape of an organ chamber using deep learning and convolutional networks to deduce the shape of the organ chamber. The ISS aligns the inferred shape of the segmented chamber in the various images to place the data from each image in register. In this way, multiple images of the image stack can be compared to each other. Alignment is necessary due to movement of an organ during the capture of a series of images in an image stack.

Figure 1:
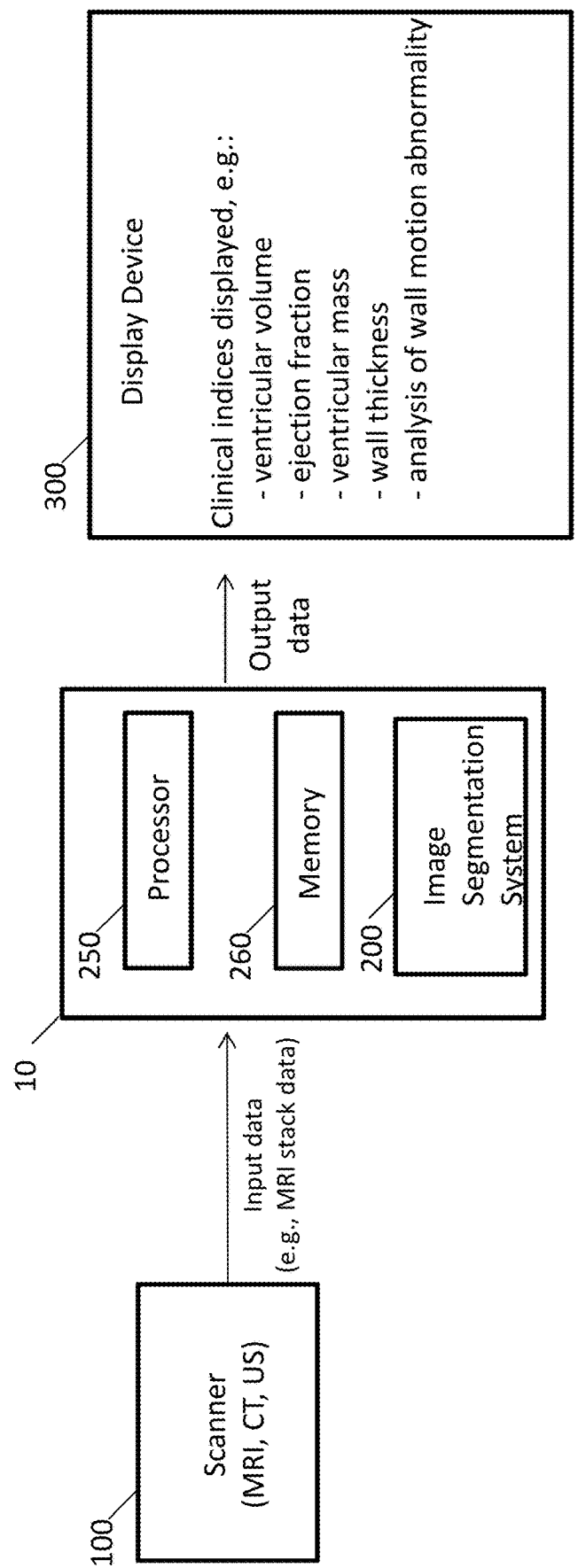
FIG. 1: Diagram of an Image Segmentation System configured to transform input image stack data into output data.

FIG. 1 includes a block diagram of a computing devices environment including a scanner 100, one or more computing devices 10, and a display device 300. The one or more computing devices 10 can include one or more hardware processors 250 that is programmed to implement some or all of the aspects of an image segmentation system (ISS) 200. The memory 260 can store executable instructions corresponding to the processes and functionalities of the ISS 200 described below. For example, the ISS 200 can acquire image stack data generated by a scanner 100 and transform the image stack data to a physiological output, such as clinical indices (e.g., heart ventricular volume, ejection fraction, ventricular mass, chamber wall thickness and analysis of a wall motion abnormality). In some embodiments, the ISS 200 can receive image data from one or more data repositories (not shown) where images generated from the scanner 100 are stored.

While FIG. 1 depicts a single computing device 10, it should be understood that a variety of different system environments and configurations are possible, contemplated, and within the scope of the present disclosure. For instance, some embodiments may include additional computing devices, services, and/or networks, and may implement various functionality of the ISS 200 locally or remotely on other computing devices. Further, various entities may be integrated into to a single computing device or system or distributed across additional computing devices or systems, etc.

Furthermore, it should be appreciated that, depending on the configuration, the computing device 10 may include other elements not shown in FIG. 1, such as an operating system, programs, input/output devices like a speaker, a keyboard, a display device, a transceiver unit and an antenna for wireless communication with other with other devices, any other appropriate systems, e.g., communicatively coupled to a network.

The memory device 260 may include a non-transitory storage medium that stores data. For example, the memory device 260 may include one or more of a dynamic random access memory (DRAM) device, a static random access memory (SRAM) device, flash memory, a hard disk drive, a floppy disk drive, a disk-based memory device (e.g., CD, DVD, Blue-Ray™, etc.), a flash memory device, or some other known non-volatile storage device. The memory device 260 may be included in the ISS 200 or in another computing device and/or storage system distinct from but coupled to or accessible by the ISS 200. In some embodiments, the memory device 260 may store data in association with a database management system (DBMS). For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

In an embodiment, the computing device 10 is a computation server. The computation server may be any computing device having one or more hardware processors and a computer-readable storage medium (e.g., a memory) to facilitate the ISS 200 to detect and recognize objects. In network-based embodiments, a computation server may receive data from a scanner 100 or a data repository storing scanner images, process the scanner data, and send results of processing to a display device 300.

In some embodiments, the ISS 200 may utilize a graphics processing unit (GPU) to facilitate accelerated computing, including the use of a GPU together with a central processing unit (CPU) to accelerate deep learning, analytics, and engineering applications. GPU-accelerated computing offloads computation-intensive portions of the application to the GPU, while the remainder of the code still runs on the CPU. A CPU consists of a few cores optimized for sequential serial processing while a GPU has a parallel architecture consisting of smaller, more efficient cores designed for handling multiple tasks simultaneously.

Figure 2:
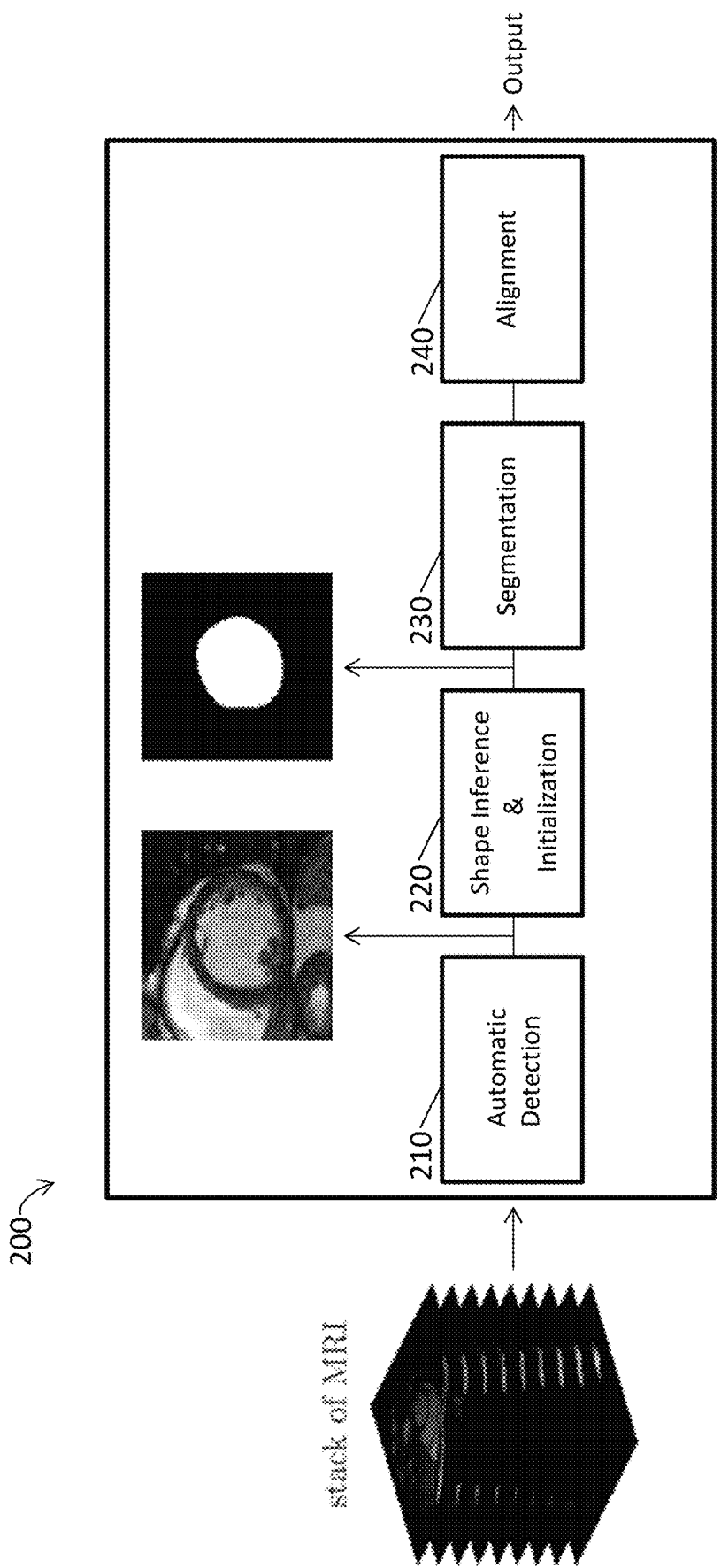
FIG. 2: Diagram of an Image Segmentation System configured to automatically detect a region of interest (ROI), infer the shape of an organ chamber, segment the organ chamber and align the inferred shape of the segmented chamber in various images.

FIG. 2 illustrates a block diagram of an example ISS 200. The figure shows some of the functionalities of the ISS 200 described more in detail below. For example, in an embodiment, the ISS 200 automatically detects a region of interest (e.g., an area of an image that contains a left ventricle of a heart) 210 from scanner image data, infers shape of an organ chamber 220 based on the automatic detection, segments the organ chamber from the image 230 and aligns the segmented data from related images in an image stack 240. The ISS outputs physiological data that is used by a medical practitioner. Physiological data can include visualization of a detected portion of an organ, such as heart, and/or other physiological parameters determined from the detected portion of the organ. Physiological parameters can include clinical indices, such as ventricular volume, ejection fraction, ventricular mass, wall thickness, analysis of wall motion abnormality. In an embodiment, the ISS 200 improves automatic detection of organ that results in improvement in calculation of the physiological parameters.

Automatic Detection

Figure 3:
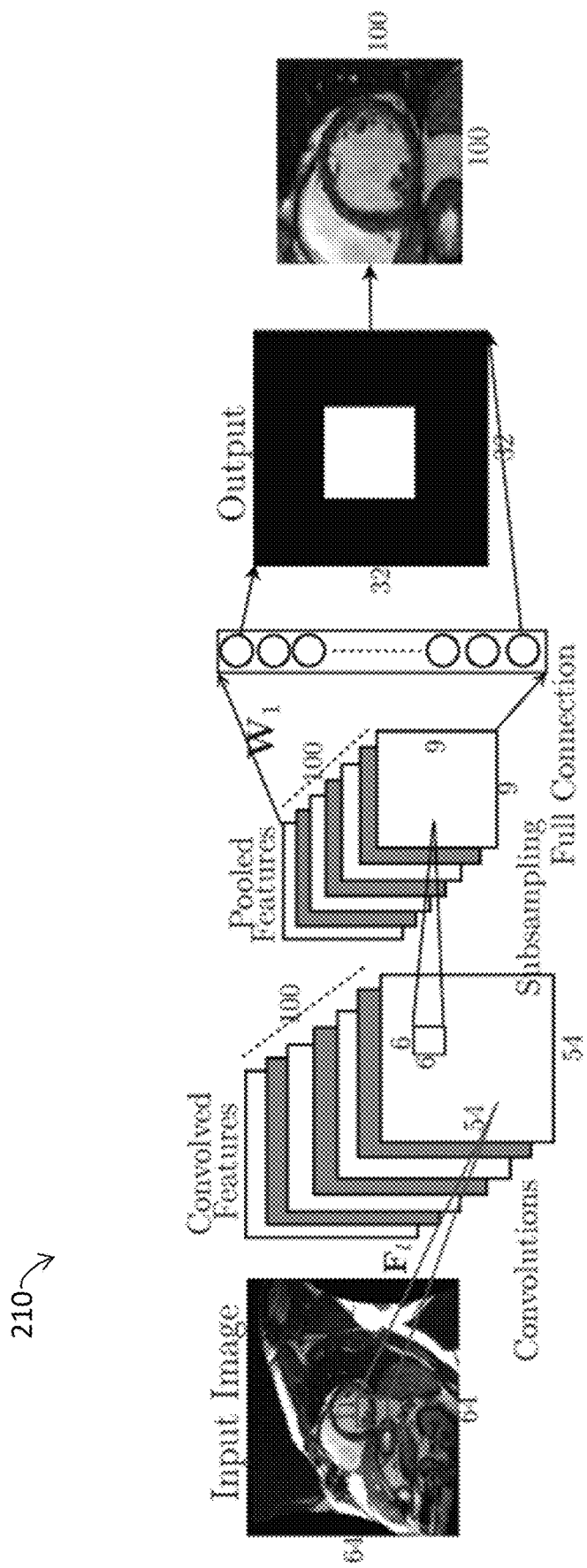
FIG. 3: Block diagram of automatic detection of an organ in an MRI dataset.

Raw MRI datasets usually include an organ of interest (e.g., a heart) and its surrounding organs. To reduce the computational complexity and processing time, and to improve accuracy, the first step of the algorithm used is to locate the organ or organ chamber and compute a region of interest (ROI) around it. As an example, a block diagram of the automatic left ventricle (LV) detection developed using convolutional networks is illustrated in FIG. 3. To reduce complexity, the ISS may down-sample the original image size, e.g., from 256×256 down-sampled to 64×64 and use the down-sampled image as input.

Then, the ISS convolves filters with the input image to obtain convolved feature maps. Next, the ISS uses average pooling to sub-sample the convolved feature maps (see Boureau, Y.-L. et al. 2010 Proceedings of the 27th International Conference on Machine Learning (ICML-10), pp. 111-118). Accordingly, the ISS computes average values over non-overlapping neighborhoods in each feature map. Finally, the ISS unrolls pooled features as a vector and fully connects the pooled features to a logistic regression layer with outputs, thereby generating a mask that specifies the ROI. The ISS computes the center of the mask, which is used to crop an ROI from the original image for further processing in the next stage.

Before the ISS uses the convolution network for organ chamber localization, the network is trained. During training, the ISS obtains optimum parameters of the network. To train the convolution network, the ISS obtains the optimum values of filters as well as other parameters. In common convolutional networks, a large training set is usually available. Therefore, the ISS utilizes the training set to initialize the filters randomly and then trains the convolutional network. The ISS constructs the filters simultaneously during training. In some applications, the number of training and labeled data are limited. As such, instead of random initialization, the ISS may obtain filters using a sparse autoencoder (AE), which acts as a pre-training step. This helps training the network with the limited amount of data while avoiding overfitting.

Shape Inferring

The ISS utilizes a trained, stacked-AE to infer organ chamber shape. For example, the stacked-AE may have one input layer, multiple hidden layers (e.g., 2-3), and one output layer. The ISS sub-samples the sub-image obtained from the previous block and unrolls the data as a vector and feeds it to the input layer. The hidden layers build abstract representations. The ISS uses the output layer to compute and produce a binary mask. For example, the binary mask may be black (zero) everywhere except at the organ chamber borders.

The ISS trains the stacked-AE in two steps: pre-training and fine-tuning. In the event that access to labeled data is limited, a layer-wise pre-training may be performed. The layer-wise pre-training helps prevent overfitting, and leads to a better generalization. During the pre-training step, parameters $W_4$, $W_5$ of the stacked-AE are obtained layer-by-layer with no labeled data. Parameter $W_6$ of the stacked-AE is obtained using the labeled data (see FIG. 4).

The input layer and the hidden layer $H_1$ are departed from the stacked-AE. By adding an output layer with the same size as the input layer to the two departed layers (input layer and $H_1$) a sparse AE is constructed. The sparse AE is trained in an unsupervised way to obtain $W_4$.

The training input/output data of the sparse AE are sub-images centered at the organ chamber extracted from the full-size training images. The ISS resizes the input image to be compatible with the input size of the stacked-AE. Once training of the first sparse AE is complete, the ISS discards the output layer. The ISS uses the hidden units' outputs in the AE as input to a subsequent hidden layer ($H_2$) (see FIG. 4). Then, the ISS constructs another sparse AE by departing the hidden layers ($H_1$ and $H_2$) from the stacked AE. As in the case of automatic detection, the training process is performed only once.

Segmentation

The ISS employs a deformable model combined with the inferred shape for accurate segmentation. Deformable models are dynamic contours that evolve by minimizing an energy function. The energy function reaches its minimum when the contour lies on the boundary of the object of interest. In most conventional deformable methods, the output contours tend to shrink inward or leak outward (e.g., due to the presence of LV's papillary muscles and small contrast between surrounding tissues). The ISS solves these issues by using the inferred shape from the previous stage as a good initialization. In addition, the ISS incorporates the shape into the energy function to prevent the contour from shrinkage/leakage. The ISS uses a deformable method to seek a unique contour, which lies on the boundary of the object of interest.

Alignment

Figure 5:
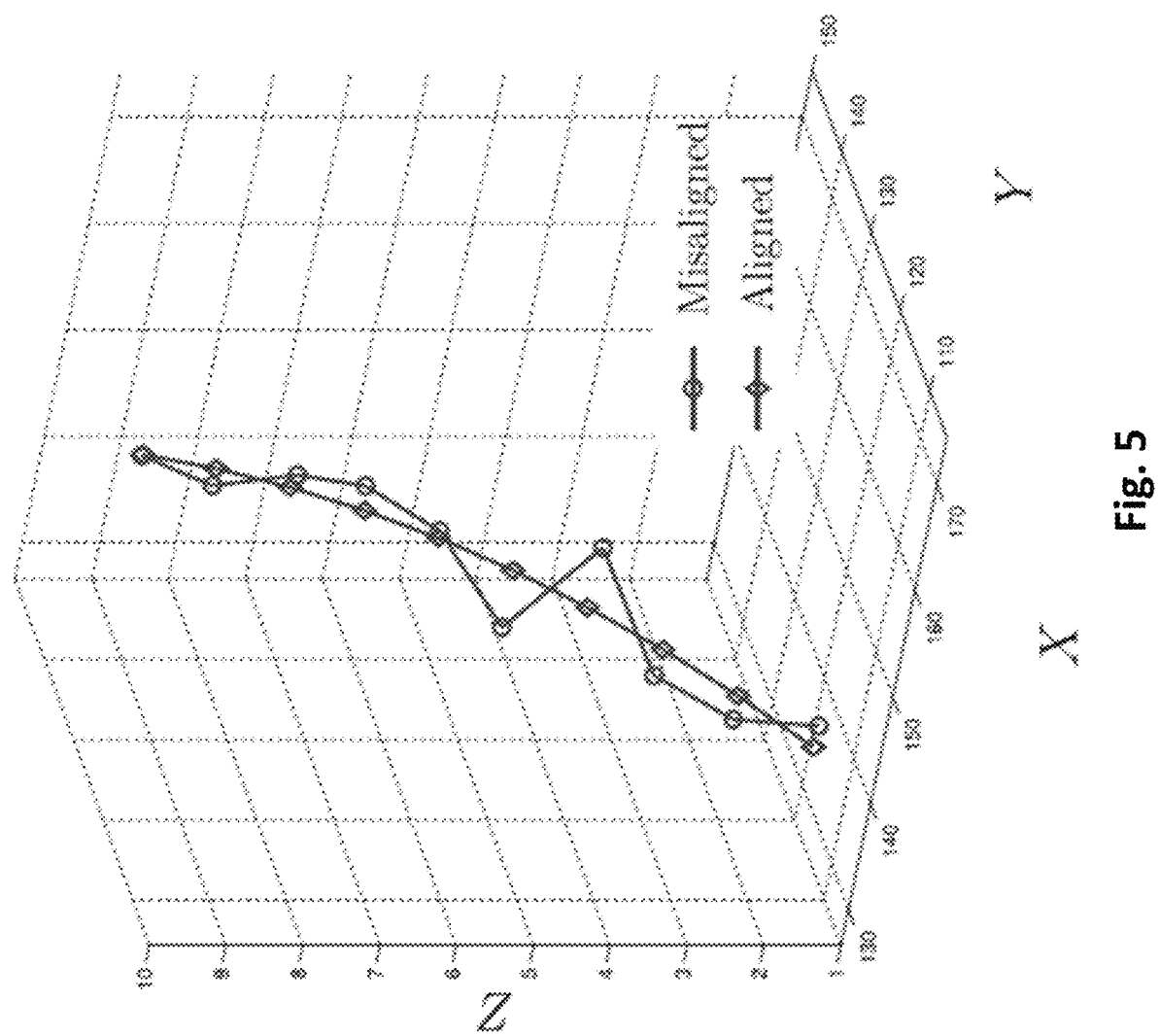
FIG. 5. Misaligned centers of contours from the base to apex and corresponding aligned centers obtained from quadrature curve fitting for a typical MRI dataset with ten image slices.

When reconstructing organ chambers in 3D, it is often necessary to consider possible misalignment between image slices. Misalignment of MRI stack image data occur mainly due to respiratory and patient motions during MRI scans. Ignoring misalignment leads to jagged discontinuous surfaces in the reconstructed volume. To overcome this issue, the ISS introduces a misalignment estimation and correction using quadratic polynomials. After estimating the unknown parameters, the actual center coordinates are estimated. Finally, the contours are registered, using an affine transformation with linear interpolation, according to the estimated center values to obtain an aligned stack of contours. FIG. 5 illustrates the centers of contours from base to apex for a typical MRI dataset with ten misaligned image slices.

EXAMPLE 1

A Combined Deep-Learning and Deformable-Model Approach to Fully Automatic Segmentation of the Left Ventricle in Cardiac MRI As reported in Avendi et al. 2016 *Medical Image Analysis* 30: 108-119, segmentation of the left ventricle (LV) from cardiac magnetic resonance imaging (MRI) datasets is an essential step for calculation of clinical indices such as ventricular volume and ejection fraction. In this work, we employ deep learning algorithms combined with deformable models to develop and evaluate a fully automatic LV segmentation tool from short-axis cardiac MRI datasets. The method employs deep learning algorithms to learn the segmentation task from the ground true data. Convolutional networks are employed to automatically detect the LV chamber in MRI dataset. Stacked autoencoders are used to infer the LV shape. The inferred shape is incorporated into deformable models to improve the accuracy and robustness of the segmentation. We validated our method using 45 cardiac MR datasets from the MICCAI 2009 LV segmentation challenge and showed that it outperforms the state-of-the art methods. Excellent agreement with the ground truth was achieved. Validation metrics, percentage of good contours, Dice metric, average perpendicular distance and conformity, were computed as 96.69%, 0.94, 1.81 mm and 0.86, versus those of 79.2-95.62%, 0.87-0.9, 1.76-2.97 mm and 0.67-0.78, obtained by other methods, respectively.

1. Materials and Methods 1.1. Datasets

We used the MICCAI 2009 challenge database (Radau, P. et al. 2009 *MIDAS J Caridac MR Left Ventricle Segm Chall*) to train and assess the performance of our methodology. The MICCAI database obtained from the Sunnybrook Health Sciences Center, Toronto, Canada is publicly available online (Radau, P. et al. 2009 *MIDAS J Caridac MR Left Ventricle Segm Chall*) and contains 45 MRI datasets, grouped into three datasets. Each dataset contains 15 cases, divided into four ischemic heart failure (SC-HF-I), four non-ischemic heart failure (SC-HF-NI), four LV hypertrophy (SC-HYP) and three normal (SC-N) cases. Manual segmentation of heart chambers by experts at the end diastole (ED) and end systole (ES) is included in the database. A typical dataset contains 20 frames in 6-12 short-axis slices obtained from the base to apex. Image parameters are: thickness=8 mm, image size=256×256 pixels. The training dataset of the MICCAI database (Radau, P. et al. 2009 *MIDAS J Caridac MR Left Ventricle Segm Chall*) was used to train our method. The validation and online datasets were used for evaluation of the method.

1.2. Method

Figure 6:
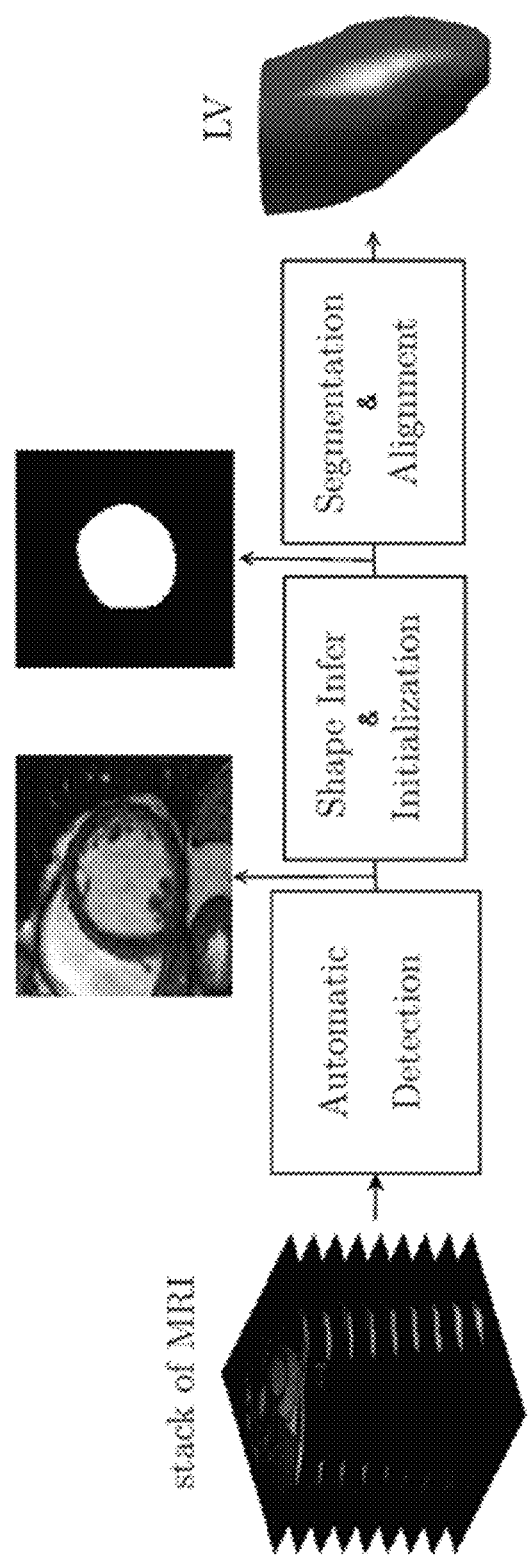
FIG. 6. Block diagram using an Image Segmentation System to automatically segment a left ventricle (LV) from cardiac stacked MRI images.

The block diagram of our method is shown in FIG. 6. A stack of short-axis cardiac MRI is provided as the input (FIG. 6). The method is carried out in three stages: (i) the region of interest (ROI) containing the LV is determined in the raw input images using convolutional networks (LeCun, Y. et al. 2010 in *Convolutional networks and applications in vision*. pp. 253-256; Szegedy, C. et al. 2013 *Adv Neural Inf Process Syst* 26: 2553-2561; Sermanet, P. et al. 2014. "Overfeat: Integrated recognition, localization and detection using convolutional networks." In: Proceedings of International Conference on Learning Representations (ICLR2014); Krizhevsky, A. et al. 2012 in *Imagenet classification with deep convolutional neural networks*. pp. 1097-1105) trained to locate the LV; (ii) the LV shape is inferred using stacked autoencoders (Bengio, Y. et al. 2013 *IEEE Trans Patt Anal Mach Intel* 35(8): 1798-1828; Bengio, Y. 2009 *Trends Mach Learn* 2(1): 1-127; Vincent, P. et al. 2010 *J Mach Learn Res* 11: 3371-3408; Baldi, P., 2012. ICML *Unsuperv Transf Learn* 27: 37-50; Deng, L. and Yu, D., 2014 *Foundations and Trends in Signal Processing* 7(3-4): 197-387; Vincent, P. et al. 2010 *J Mach Learn Res* 11: 3371-3408) trained to delineate the LV; (iii) the inferred shape is used for initialization and is also incorporated into deformable models for segmentation. Contour alignment is performed to reduce misalignment between slices for 3D reconstruction. Each stage of the block diagram is individually trained during an offline training process to obtain its optimum values of parameters. After training, we deploy the system to perform the automatic segmentation task. The three stages are further elaborated as follows:

1.2.1. Automatic Detection

The raw cardiac MRI datasets usually include the heart and its surrounding organs within the thoracic cavity. To reduce the computational complexity and time, and improve the accuracy, the first step of the algorithm is to locate the LV and compute a ROI around it. A block diagram of the automatic LV detection developed using convolutional networks is illustrated in FIG. 3. To reduce complexity, the original image size of 256×256 is down-sampled to 64×64 and used as the input.

Then, filters $F_l \in R^{11 \times 11}$, $b_0 \in R^{100}$ are convolved with the input image to obtain the convolved feature maps. Denote the gray-value input image I: $\Omega \to R$, $\Omega \subset R^2$ with size 64×64. I[i, j] represents a pixel intensity at coordinate [i, j] of the image. The pixel coordinates at the top left and bottom right of the image are [1,1] and [64,64], respectively. The convolved features are computed as $C_l[i, j] = f(Z_l[i, j])$ where $$Z_l[i, j] = \sum_{k_1=1}^{11} \sum_{k_2=1}^{11} F_l[k_1, k_2] I[i+k_1-1, j+k_2-1] + b_0[l], \quad (1)$$

for $1 \le i, j \le 54$ and $l=1, \ldots, 100$. This results in 100 convolved features $Z_l \in R^{54 \times 54}$. Here, x[i] denotes the ith element of vector x and X[i, j] denotes the element at the ith row and the jth column of matrix X.

Next, the convolved feature maps are sub-sampled using average pooling (Boureau et al., 2010). Accordingly, the average values over non-overlapping neighborhoods with size 6×6 are computed in each feature map as $$P_l[i_1, j_1] = \frac{1}{6} \sum_{i=(6i_1-5)}^{6i_1} \sum_{j=(6j_1-5)}^{6j_1} C_l[i, j], \quad (2)$$

for $1 \le i_1, j_1 \le 9$. This results in 100 reduced-resolution features $P_l \in R^{9 \times 9}$ for $l=1, \ldots, 100$.

Finally, the pooled features are unrolled as vector $p \in R^{8100}$ and fully connected to a logistic regression layer with 1024 outputs generating a mask of size 32×32 that specifies the ROI. The out-put layer computes $y_c = f(W_1 p + b_1)$, where $W_1 \in R^{1024 \times 8100}$ and $b1 \in R^{1024}$ are trainable matrices. Note that the original MR image size is 256×256. Therefore, first, the output mask is up-sampled from 32×32 to the original MR image size. The center of the mask is then computed and used to crop a ROI of size 100×100 from the original image for further processing in the next stage.

Before using the network for LV localization, it should be trained, and during training, the optimum parameters of the network ($F_l$, $b_0$, $W_1$, $b_1$) are obtained as described in the next section.

Figure 7:
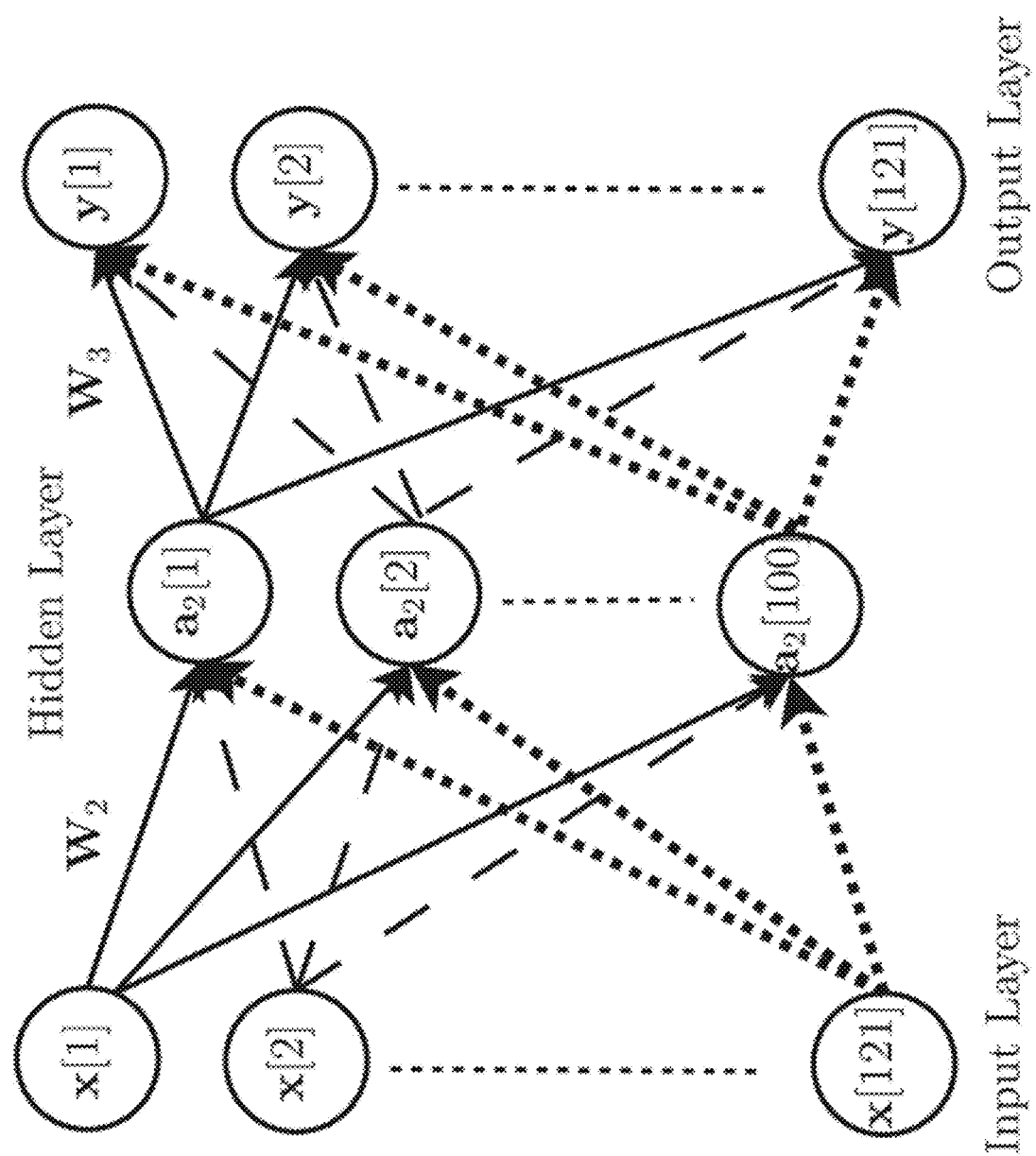
FIG. 7. Sparse autoencoder is trained to initialize filters ($F_1$).

Training convolutional network Training the convolution network involves obtaining the optimum values of filters $F_l$, $l=1, \ldots, 100$ as well as other parameters $b_0$, $W_1$, $b_1$. In common convolutional networks a large training set is usually available. Therefore, they initialize the filters ($F_l$) randomly and then train the convolutional network. The filters are constructed simultaneously during training. In our application, the number of training and labeled data is limited. As such, instead of random initialization, the filters are obtained using a sparse autoencoder (AE) which acts as a pre-training step. This helps training the network with the limited amount of data while avoids overfitting. We employ an AE with 121 input/output units and 100 hidden units as shown in FIG. 7. To train the AE, $N_1 \approx 10^4$ small patches of size 11×11 are randomly selected from the raw input images of the training dataset. Each patch is then unrolled as vector $x^{(i)} \in R^{121}$, $i=1, \ldots, N_1$ and fed to the input layer of the AE. Denote the weights between the input layer and the hidden layer with $W_1 \in R^{100 \times 121}$ and the weights between the hidden layer and output layer with $W_2 \in R^{121 \times 100}$. The hidden layer computes $a_2^{(i)} = f(W_2 x^{(i)} + b_2)$ and the final output is $y^{(i)} = f(W_3 a_2^{(i)} + b_3)$, where $f(x) = 1/(1+e^{-x})$ is the sigmoid activation function and $b_2 \in R^{100}$, $b_3 \in R^{121}$ are trainable bias vectors. The task of AE is to construct $x^{(i)}$ at the output from the hidden values. Thus, input values are used as the labeled data and no actual labeled data are required for training the AE.

The AE is optimized by minimizing the cost function $$J(W_2, b_2) = \frac{1}{2N_1} \sum_{i=1}^{N_1} |y^{(i)} - x^{(i)}|^2 + \frac{\lambda}{2}(\|W_2\|^2 + \|W_3\|^2) + \beta \sum_{j=1}^{k} KL(\rho \| \hat{\rho}_j). \quad (3)$$

Here, the first term computes the average squared-error between the final output $y^{(i)}$ and the desired output $x^{(i)}$. Furthermore, to avoid overfitting, the $l_2$ regularization/weight decay term is added to the cost function to decrease the magnitude of the weights. To learn higher representation from the input data, a sparsity constraint is imposed on the hidden units. In this way, a sparse AE is built. Here, the Kullback-Leibler (KL) divergence (Kullback, S. and Leibler, R. A. 1951 *Ann Math Statist* 22(1): 79-86) constrains the mean value of the activations of the hidden layer $\hat{\rho}_j = (1/N_1) \Sigma_{i=1}^{N_1} a_2^{(i)}[j]$, $j=1, \ldots, 100$, to be equal to the sparsity parameter $\rho$, which is usually a small value. The weight decay coefficient $\lambda$ and the sparsity coefficient $\beta$ control the relative importance of the three terms in the cost function. The optimization parameters are set as $\lambda=10^{-4}$, $\rho=0.1$ and $\beta=3$. Once autoencodr is trained, $W_2$ is configured as 100 filters $F_l \in R^{11 \times 11}$, $l=1, \ldots, 100$ and $b_0=b_2$ for the next step.

Figure 8:
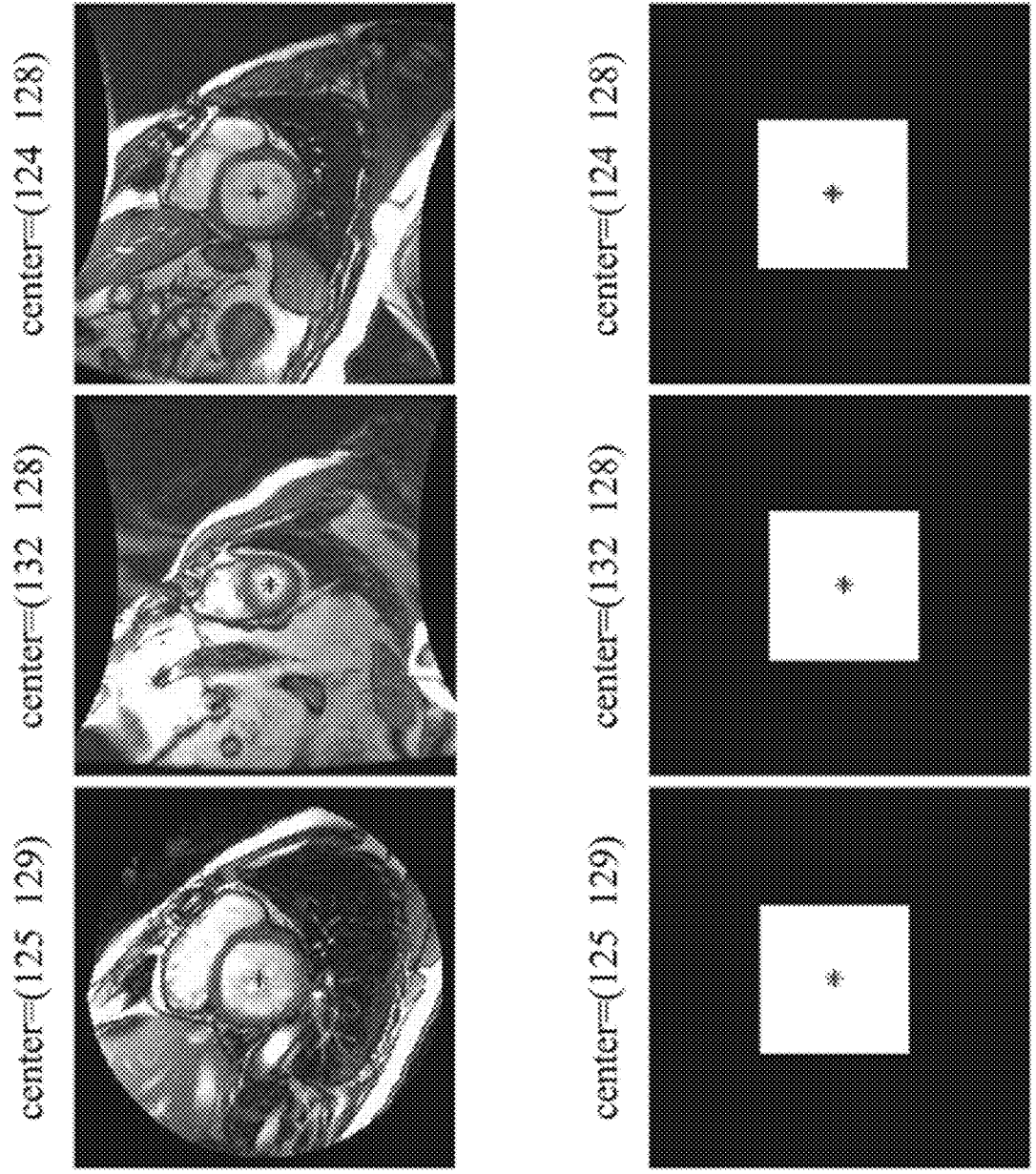
FIG. 8: Typical input images (top) and the corresponding binary masks (bottom) used for training of the automatic detection network. The center of an image (top) is the same as the center of a corresponding region of interest (ROI) (bottom).

Then, we perform a feed-forward computation using Eqs. (1) and (2) until the output layer. Next, the output layer is pre-trained by minimizing the cost function $$(W_1, b_1) = \frac{1}{2N_2} \sum_{i=1}^{N_2} |y_c^{(i)} - I_{[0]}^{(i)}|^2 + \frac{\lambda}{2}(\|W_1\|^2), \quad (4)$$

where $I_{roi}^{(i)} \in R^{1024}$ is the labeled data corresponding to the ith input image and $N_2$ is the number of training data. The labeled data at the output layer are binary masks, as shown in FIG. 8, generated based on manual training contours. As seen, a binary mask is an image with black background and a white foreground corresponding to the ROI. The foreground is centered at the center of the LV contour, which is known from the training manual contours. The binary mask is down-sampled to 32×32 and then unrolled as vector $I_{roi}^{(i)}$ to be used for training.

Finally, the whole network is fine-tuned by minimizing the cost function $$J(F_l, b_0, W_1, b_1) = \frac{1}{2N_2} \sum_{i=1}^{N_2} |y_c^{(i)} - I_{[0]}^{(i)}|^2 + \frac{\lambda}{2}\left(\|W_1\|^2 + \sum_{l=1}^{100} \|F_l\|^2\right) \quad (5)$$

The cost function can be minimized using the backpropagation algorithm. Here, $\lambda=10^{-4}$. The training process is performed only once.

1.2.2. Shape Inferring

We utilized and trained a stacked-AE to infer the LV shape. The stacked-AE has one input layer, two hidden layers, and one output layer. The sub-image obtained from the previous block was sub-sampled and unrolled as vector $x_s \in R^{4096}$ and fed to the input layer. The hidden layers build the abstract representations by computing $h_1=f(W_4 x_s+b_4)$ and $h_2=f(W_5 h_1+b_5)$. The output layer computes $y_s=f(W_6 h_2+b_6)$ to produce a binary mask. The binary mask is black (zero) everywhere except at the LV borders. Here, $W_4 \in R^{100 \times 4096}$, $b_4 \in R^{100}$, $W_5 \in R^{100 \times 100}$, $b_5 \in R^{100}$ and $W_6 \in R^{4096 \times 100}$, $b_6 \in R^{4096}$ are trainable matrices and vectors that are obtained during the training process, as described in the next section.

Training Stacked-AE

The training of the stacked-AE was performed in two steps: pre-training and fine-tuning. Since the access to labeled data was limited in our application, a layer-wise pre-training was performed. The layer-wise pre-training helps prevent overfitting, and leads to a better generalization. During the pre-training step, parameters $W_4$, $W_5$ of the stacked-AE were obtained layer-by-layer with no labeled data. Parameter $W_6$ of the stacked-AE was obtained using the labeled data. The details are as follows.

First, the input layer and the hidden layer $H_1$ were departed from the stacked-AE. By adding an output layer with the same size as the input layer to the two departed layers (input layer and $H_1$) a sparse AE was constructed (similar to FIG. 7). The sparse AE was trained in an unsupervised way as explained above to obtain $W_4$. The optimization parameters were set as $\lambda=3 \times 10^{-3}$, $\rho=0.1$, $\beta=3$.

The training input/output data of the sparse AE are sub-images of size 100×100 centered at the LV extracted from the full-size training images. The input image was resized to 64×64 to be compatible with the input size 4096 of the stacked-AE. Once training of the first sparse AE was complete, its output layer was discarded. The hidden units' outputs in the AE were used as the input for the next hidden layer $H_2$ in FIG. 4.

Figure 9:
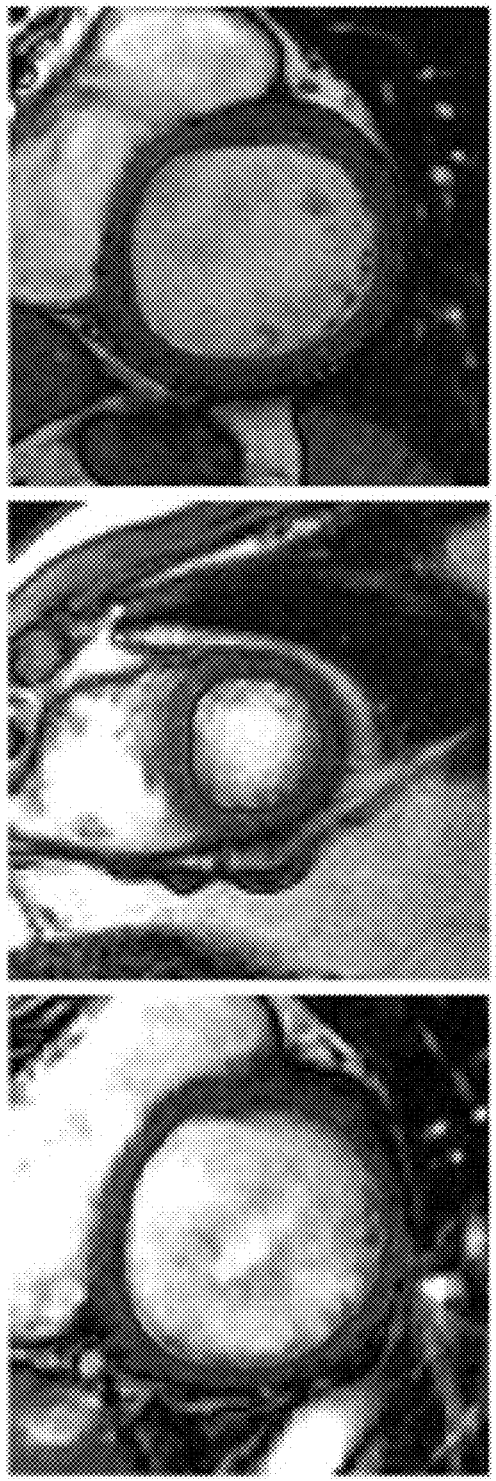
FIG. 9: Typical sub-images with manual LV segmentation (top) and the corresponding binary masks (bottom) used for training the stacked autoencoder.
Figure 9:
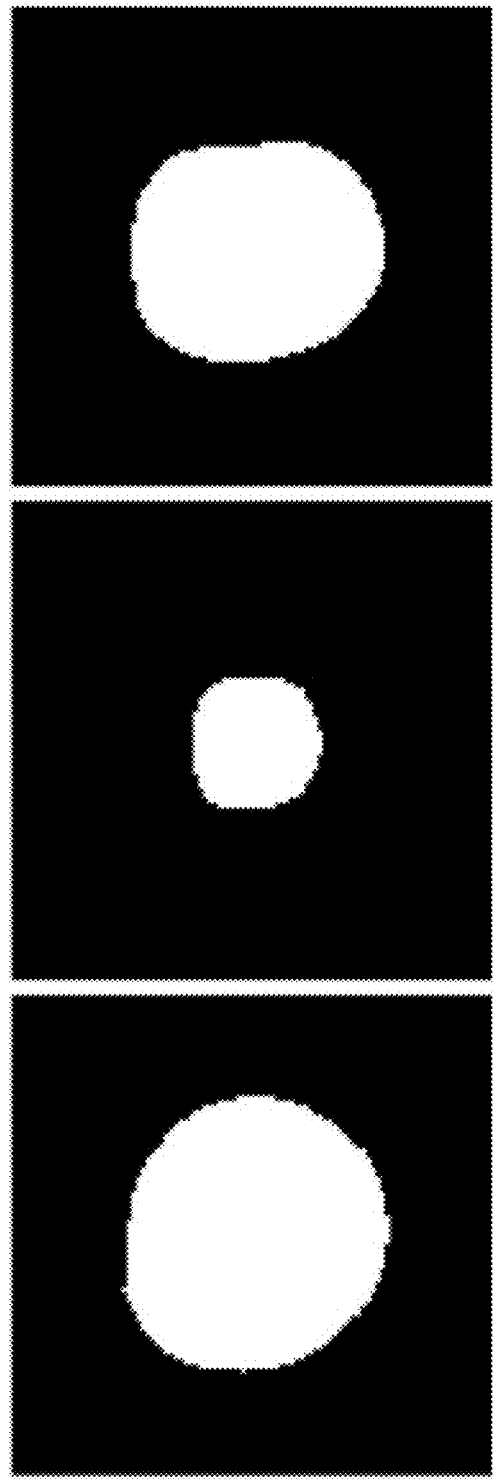

Then, hidden layers $H_1$ and $H_2$ were departed from the stacked-AE to construct another sparse AE. Similarly, the second sparse AE was trained to obtain $W_5$. Again, no labeled data was required. This step can be repeated depending on the number of hidden layers. The last hidden layer's outputs were used as the input to the final layer, which was trained in a supervised mode to obtain $W_6$. The cost function to train the final layer computes $$J(W_6, b_6) = \frac{1}{2N_2} \sum_{i=1}^{N_2} |y_v^{(i)} - I_{lv}^{(i)}|^2 + \frac{\lambda}{2}\|W_6\|^2, \quad (6)$$

where $I_{lv}^{(i)} \in R^{4096}$ is the labeled data corresponding to the ith image. The labeled data are binary masks created from manual segmentations drawn by experts. FIG. 9 depicts three examples of input images and corresponding labels used for training of the stacked-AE. Note that the binary mask is unrolled as vector $I_{lv}$ to be used during optimization.

Figure 4:
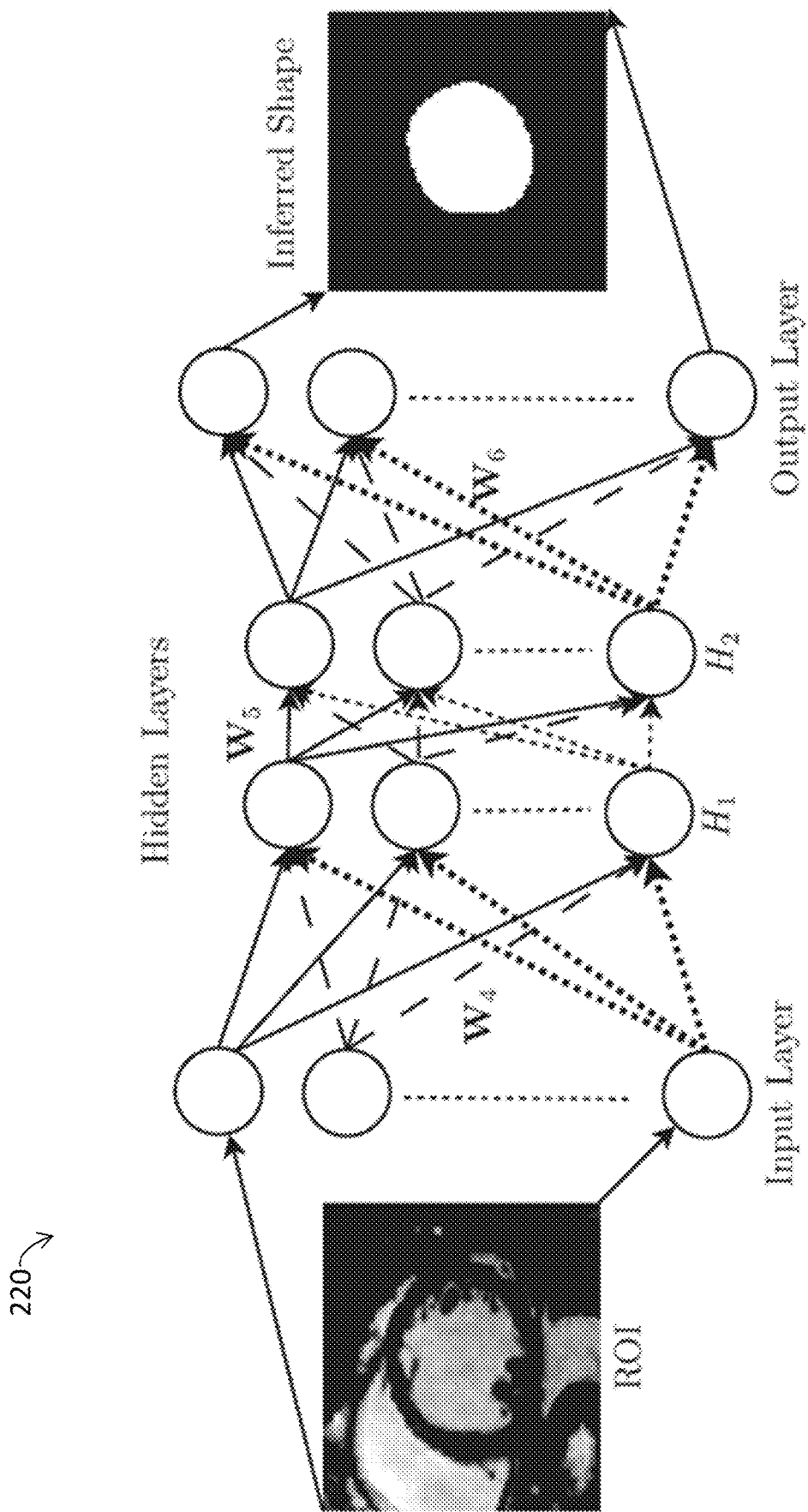
FIG. 4: Stacked auto-encoder (AE) for inferring the organ shape. The input is a sub-image and the output is a binary mask.

The layer-wise pre-training results in proper initial values for parameters $W_4$, $W_5$, $W_6$. In the second step, the whole architecture is fine-tuned by minimizing the cost function $$J(W_4, W_5, W_6, b_4, b_5, b_6) = \frac{1}{2N_2} \sum_{i=1}^{N_2} |y_v^{(i)} - I_{lv}^{(i)}|^2 + \frac{\lambda}{2}(\|W_4\|^2 + \|W_5\|^2 + \|W_6\|^2), \quad (7)$$

using the back-propagation algorithm with respect to the supervised criterion. Here $\lambda=10^{-4}$. As in the case of automatic detection, the training process is performed only once (FIG. 4).

1.2.3. Segmentation and Alignment

The final block employs a deformable model combined with the inferred shape for accurate segmentation. Deformable models are dynamic contours that evolve by minimizing an energy function. The energy function reaches its minimum when the contour lies on the boundary of the object of interest. In most conventional deformable methods, the output contours tend to shrink inward or leak outward due to the presence of LV's papillary muscles and small contrast between surrounding tissues. We solve these issues by using the inferred shape from the previous stage as a good initialization. In addition, the shape is incorporated into the energy function to prevent the contour from shrinkage/leakage.

Denote the input sub-image with $I_s: \Omega_s \rightarrow R$, $\Omega_s \subset \Omega \subset R^2$ and the coordinate of image pixels with $(x, y)$. Let us define $\varphi(x, y)$ as the level set function that returns negative values for the pixels inside a contour and positive values for the pixels outside. Also, denote the level set function corresponding to the inferred shape with $\varphi_{shape}(x, y)$. The energy function is defined as $$E(\varphi) = \alpha_1 E_{len}(\varphi) + \alpha_2 E_{reg}(\varphi) + \alpha_3 E_{shape}(\varphi), \quad (8)$$

which is a combination of the length-based energy function (Chan, T. and Vese, L. 2001 *IEEE Trans Img Proc* 10(2): 266-277)

$$E_{len}(\varphi) = \int_{\Omega_x} \delta(\varphi) |\nabla \varphi| dx dy, \quad (9)$$

region-based energy term (Chan, T. and Vese, L. 2001 *IEEE Trans Img Proc* 10(2): 266-277)

$$E_{reg}(\varphi) = \int_{\Omega_+} |I_s - c_1|^2 H(\varphi) dx dy + \int_{\Omega_-} |I_s - c_2|^2 (1 - H(\varphi)) dx dy, \quad (10)$$

and prior shape energy term $$E_{shape}(\varphi) = \int_{\Omega_x} (\varphi - \varphi_{shape})^2 dx dy. \quad (11)$$

Here, $\delta(\varphi)$, $H(\varphi)$ and $\nabla(\cdot)$ are the delta function, Heaviside step function and the gradient operation, respectively. Also $c_1$ and $c_2$ are the average of the input image $I_s$ outside and inside the contour (Chan, T. and Vese, L. 2001 *IEEE Trans Img Proc* 10(2): 266-277), respectively. The $\alpha_i$'s, i=1, . . . , 3 are the combining parameters determined empirically during training as $\alpha_1 = 1$, $\alpha_2 = 0.5$, $\alpha_3 = 0.25$. In other words, given images and labels of the training dataset, the outcome of the combined de-formable model was compared with the corresponding label and parameters $\alpha_1$, $\alpha_2$, $\alpha_3$ were tweaked to obtain the best evaluation metrics. The deformable method seeks a unique contour denoted by C* (or equivalently $\varphi^*$), which lies on the boundary of the object of interest. This is obtained by minimizing the energy function over $\varphi$ as:

$$\phi^* = \arg \min_\phi \{E(\phi)\}, \quad (12)$$

that can be solved using the gradient descent algorithm. By letting $\varphi$ be a function of time and using the Euler-Lagrange equation (Chan, T. and Vese, L. 2001 *IEEE Trans Img Proc* 10(2): 266-277; Pluempitiwiriyawej, C. et al. 2005 *IEEE Trans Med Img* 24(5): 593-603), we obtain $$\frac{d\phi}{dt} = -\frac{dE}{d\phi} = \quad (13)$$

$$\delta(\phi) \left[ \alpha_1 Div \left( \frac{\nabla \phi}{|\nabla \phi|} \right) + \alpha_2 (I_S - c_2)^2 - \alpha_2 (I_S - c_1)^2 - 2\alpha_3 (\phi - \phi_{shape}) \right],$$

where $Div(\cdot)$ is the divergence operator.

The gradient descent starts with an initialization of $\varphi(0)$ obtained from the inferred shapes and is updated iteratively $$\phi^{(k+1)} = \phi^{(k)} + \gamma \frac{d\phi}{dt}, \quad (14)$$

to obtain the final $\varphi^*$ or contour C*. Here, $\gamma$ is the step size, which is a small number. The stopping criterion checks whether the solution is stationary or not by computing the difference between the length of the contours in the current and previous iterations.

When reconstructing the cardiac chambers in 3D, it is necessary to consider possible misalignment between the image slices. Misalignment occurs in cardiac MRI mainly due to respiratory and patient motions during MRI scans. Ignoring misalignment leads to jagged discontinuous surfaces in the reconstructed volume. To overcome this issue, we introduce a misalignment estimation and correction using quadratic polynomials.

Accordingly, the center coordinate of the LV contours is computed from the obtained LV segmentation in all image slices, denoted as $(\tilde{x}_i, \tilde{y}_i)$, for i=1, . . . , n, where n is the number of slices. Let us denote the actual center coordinate of the ith contour with $(x_i, y_i)$. Then we can write $$\tilde{x}_i = x_i + w_i,$$

$$\tilde{y}_i = y_i + v_i, \quad (16)$$

where $w_i \sim N(0, \sigma^2 w)$, $v_i \sim N(0, \sigma^2 v)$ are the misalignment values due to motion artifacts, modeled by independent Gaussian random variables.

Using quadratic assumption for the curvature, $$x_i = a_1 i^2 + b_1 i + c_1, \quad (17)$$

$$y_i = a_2 i^2 + b_2 i + c_2, \quad (18)$$

Here $a_1$, $b_1$, $c_1$, $a_2$, $b_2$, $c_2$ are unknown parameters estimated based on minimizing the mean squared error as $$\hat{a}_1, \hat{b}_1, \hat{c}_1 = \arg \min_{a_1, b_1, c_1} \sum_{i=1}^{n} (\tilde{x}_i - a_1 i^2 - b_1 i - c_1)^2, \quad (19)$$

$$\hat{a}_2, \hat{b}_2, \hat{c}_2 = \arg \min_{a_2, b_2, c_2} \sum_{i=1}^{n} (\tilde{y}_i - a_2 i^2 - b_2 i - c_2)^2. \quad (20)$$

After estimating the unknown parameters, the actual center coordinates are estimated from Eqs. (17) and (18). Finally, the contours were registered, using an affine transformation with linear interpolation, according to the estimated center values to obtain an aligned stack of contours.

2. Implementation Details

Images and contours of all the cases in the training dataset of the MICCAI challenge (Radau, P. et al. 2009 *MIDAS J Caridac MR Left Ventricle Segm Chall*) were collected and divided into the large-contour and small-contour groups. Typically, the large contours belong to image slices near the base/middle and the small contours belong to the apex of the heart since the contours near the apex are much smaller than the contours at the base. As such, there are around 135 and 125 images in each group, respectively. We artificially enlarged the training dataset using techniques such as image translation, rotation and changing the pixel intensities based on the standard principal component analysis (PCA) technique as explained by Koikkalainen, J. et al. 2008 *IEEE Trans Med Imaging* 27(11): 1643-1654. Using these techniques, we augmented the training dataset by a factor of ten. Eventually, we had around 1350 and 1250 images/labels in each group, respectively. Then, we built and trained two networks, one for the large-contour dataset and one for the small-contour dataset.

Considerable overfitting may happen in deep learning networks due to the large number of parameters to be learned. We paid great attention to prevent the overfitting problem in our networks. To resolve this issue, we adopted layer-wise pre-training, $l_2$ regularization and sparsity constraints as explained above. Although the lack of training data was a challenge, the use of layer-wise pre-training was greatly helpful. We also kept the number of units in the hidden layers small and did not go beyond three layers to ensure that the number of parameters is tractable. Furthermore, during the training process, we performed cross-validation by dividing the training dataset into 12 subjects for training and 3 subjects for validation, as well as early stopping to monitor and prevent overfitting. In addition, we artificially enlarged the training dataset as mentioned earlier. The hyper-parameters of the networks, i.e., number of layers and units, number of filters, filter and pooling sizes, etc., are determined empirically during the cross-validation process.

In the current study, our method was developed in MATLAB 2014a, performed on a Dell Precision T7610 workstation, with Intel® Xeon® CPU 2.6 GHz, 32 GB RAM, on a 64-bit Windows 7 platform. The method was trained using the training dataset and tested on the online and validation datasets of the MICCAI database (Radau, P. et al. 2009 *MIDAS J Caridac MR Left Ventricle Segm Chall*).

3. Validation Process

We assess the performance of our automated method by comparing its accuracy with that of the gold standard (manual annotations by experts). Accordingly, average perpendicular distance (APD), Dice metric, Hausdorff distance, percentage of good contours and the conformity coefficient (Chang, H.-H. et al. 2009 *Neuroimage* 47(1): 122-135) were computed. As recommended in Radau, P. et al. 2009 *MIDAS J Caridac MR Left Ventricle Segm Chall*, a segmentation is classified as good if the APD is less than 5 mm. The average perpendicular distance measures the distance from the automatically-segmented contour to the corresponding manually—drawn expert contour, averaged over all contour points (Radau, P. et al. 2009 *MIDAS J Caridac MR Left Ventricle Segm Chall*). A high value implies that the two contours do not closely match (Radau, P. et al. 2009 *MIDAS J Caridac MR Left Ventricle Segm Chall*). The Dice metric, $DM=2(A_{am})/(A_a+A_m)$, is a measure of contour overlap considering the contour areas automatically segmented $A_a$, manually segmented $A_m$, and their intersection A. (Radau, P. et al. 2009 *MIDAS J Caridac MR Left Ventricle Segm Chall*). The Dice metric is always between zero and one, with higher DM indicating better match between automated and manual segmentations. The Hausdorff distance measures the maximum perpendicular distance between the automatic and manual contours (Queiros, S. et al. 2014 *Med Image Anal* 18(7): 1115-1131; Babalola, K. O. et al. 2008, in *Comparison and Evaluation of Segmentation Techniques for Subcortical Structures in Brain MRI*, Springer, pp. 409-416). Finally, the conformity coefficient measures the ratio of the number of mis-segmented pixels to the number of correctly segmented pixels defined as CC=(3DM−2)/DM (Chang, H.-H. et al. 2009 *Neuroimage* 47(1): 122-135).

In addition, three clinical parameters, end-diastolic volume (EDV), end-systolic volume (ESV) and ejection fraction (EF) were computed based on automatic and manual LV segmentation results and used for the correlation and Bland-Altman analyses (Bland and Altman, 1986). The correlation analysis was performed using the Pearsons test to obtain the slope and intercept equation and the Pearson R-values. To assess the intra- and inter-observer variability, the coefficient of variation (CV), defined as the standard deviation (SD) of the differences between the automatic and manual results divided by their mean values, and the reproducibility coefficient (RPC), defined as 1.96*SD, are computed.

The segmentation performance was assessed against reference contours using the evaluation code provided in Radau et al. (Radau, P. et al. 2009 *MIDAS J Caridac MR Left Ventricle Segm Chall*). Each measure was computed slice by slice and a mean value and standard deviation for all slices of a dataset were calculated.

4. Results

4.1. Illustrative Results

Figure 10:
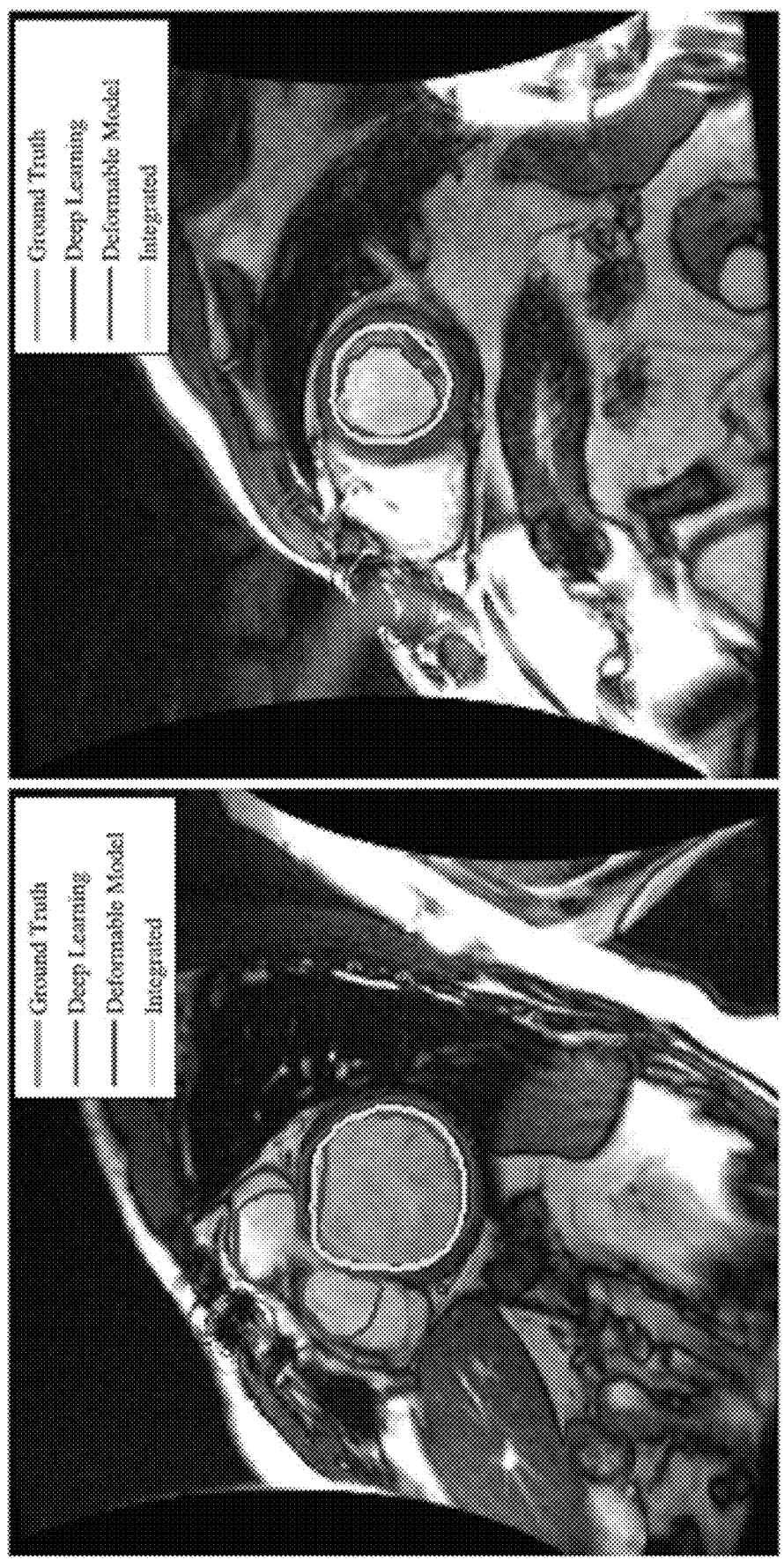
FIG. 10: Outcomes of deformable model with no shape constraint ($\alpha_3=0$), deep learning (shape inference, step 2) and combined deep learning and deformable model (final step), for two typical images.
Figure 11:
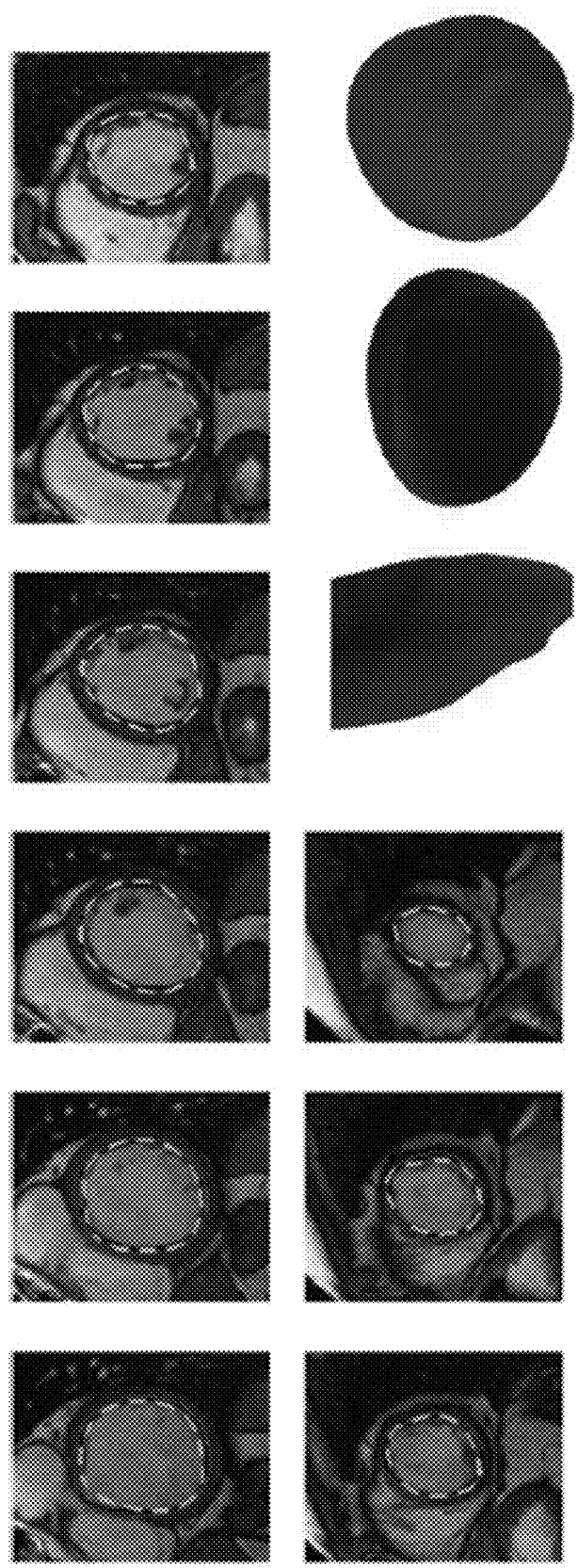
FIG. 11: Automatic (black line) and manual (dashed line) LV segmentation for a typical cardiac MRI dataset of the MICCAI database (Radau et al., 2009) in 2D and 3D (right).
Figure 12:
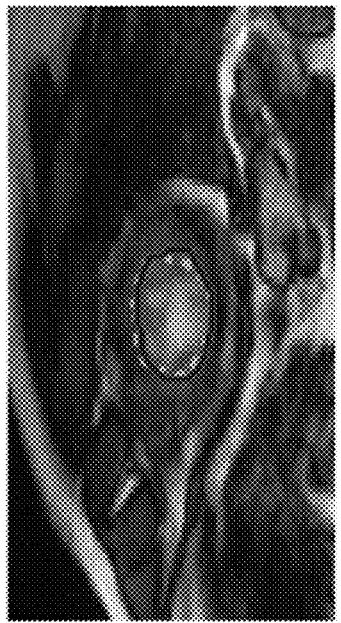
FIG. 12: Automatic (black line) and manual (dashed line) segmentation results for challenging images at the apex (right) and mid LV (left) with presence of papillary muscles for three typical cardiac MRI datasets of the MICCAI database (Radau et al., 2009).
Figure 12:
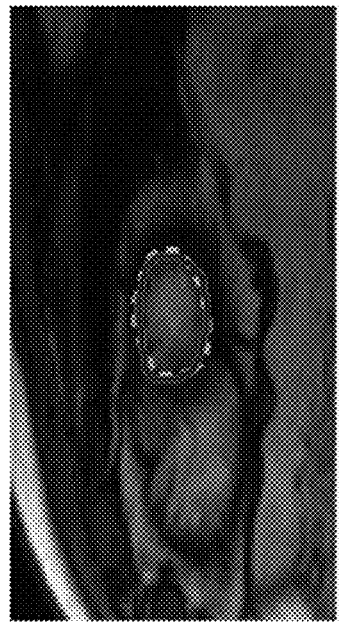
Figure 12:
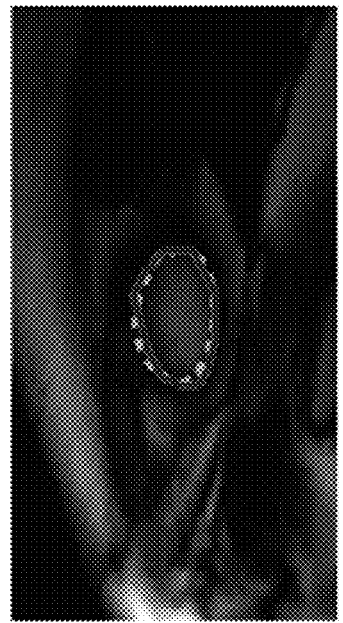
Figure 12:
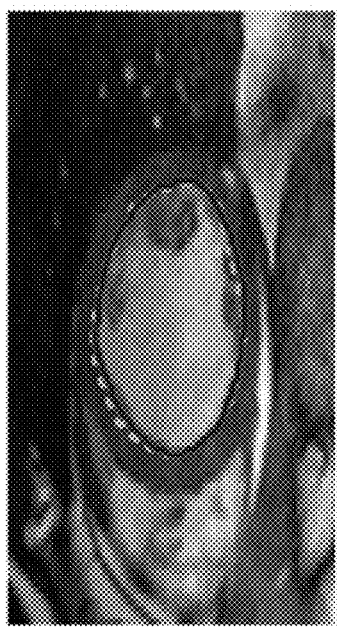
Figure 12:
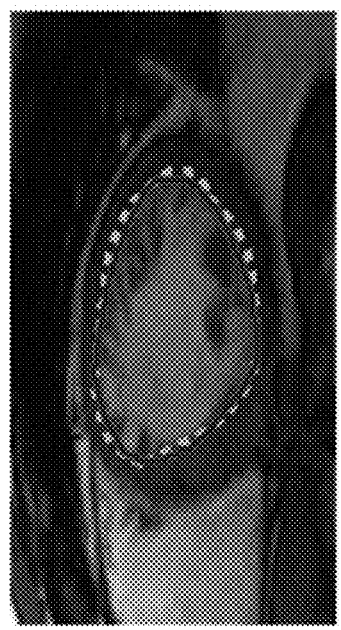
Figure 12:
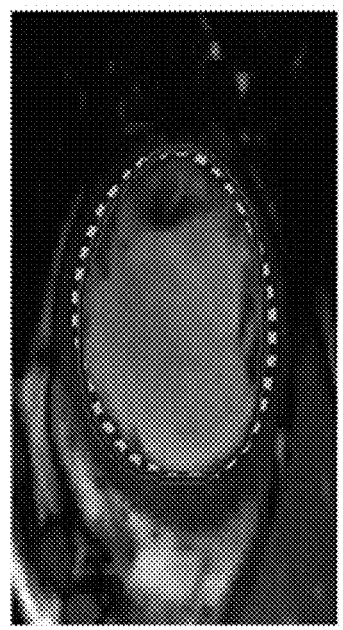
Figure 13:
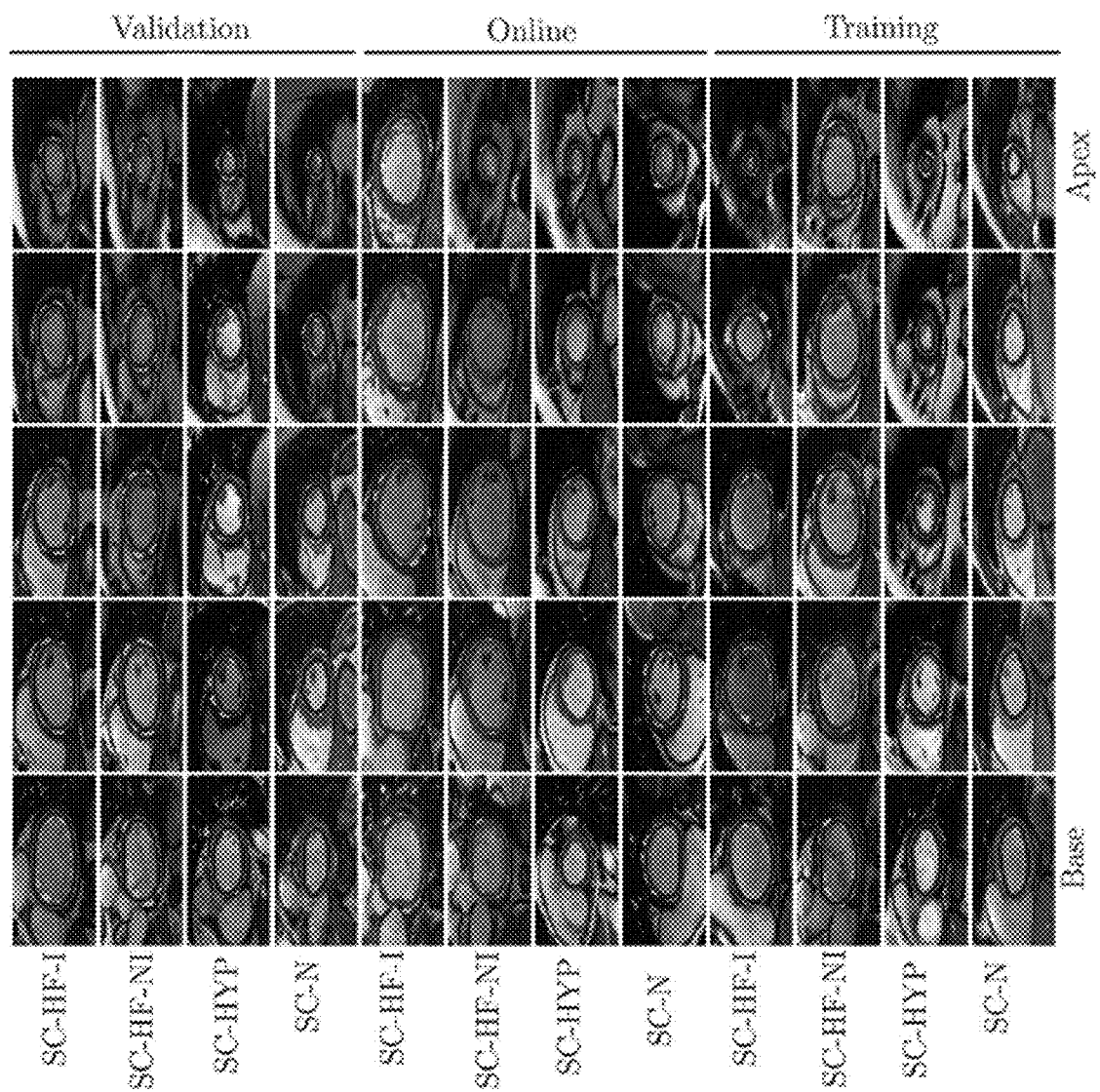
FIG. 13: Automatic (black line) and manual (dashed line) LV segmentation in the base (left), mid-ventricular (middle) and apex (right) for multiple cases of the MICCAI database (Radau et al., 2009). Each row corresponds to one patient, ischemic heart failure (SC-HF-I), non-ischemic heart failure (SC-HF-NI), LV hypertrphies (SC-HYP) and normal (SC-N).

To better understand the role of each step, the outcome of the deformable model with no shape constraint ($\alpha_3=0$), deep learning (shape inference, Step 2) and the integrated deformable model and deep learning method (final step) for two typical images are shown in FIG. 10. FIG. 11 illustrates the automatic and manual LV segmentation results for a typical cardiac MRI dataset from the base to apex as well as three views of the reconstructed LV chamber (front, base and apex views). The segmentation results for image slices at the apex and mid LV, which are generally complex due to presence of papillary muscles and low resolution, are shown in FIG. 12. In the figures, automatic segmentation results are shown in solid black lines and the ground truth manual segmentations drawn by experts are shown in dashed lines. Automatic and manual segmentation results are illustrated in FIG. 13, in which each row corresponds to one patient/dataset including normal subjects (SC-N) and the ones with ischemic heart failure (SC-HF-I), non-ischemic heart failure (SC-HF-NI) and LV hypertrophy (SC-HYP).

4.2. Quantitative Results

In Table 1, the average values and the standard deviation of the computed metrics are listed for the validation and online datasets. For each dataset, two rows of results, corresponding to the initial contour (I) obtained from the inferred shape and the final contour (F), are listed. Table 2 compares the results between our method and the state-of-the-art methods using the same database.

TABLE 1

Evaluation metrics related to our method for validation. Numbers' format: mean value (standard deviation).

| Dataset | I/F[3] | Good contours % | Dice metric | APD[1] (mm) | HD[2] (mm) | Conformity |
|---|---|---|---|---|---|---|
| Validation | I | 90 (10) | 0.90 (0.1) | 2.84 90.29) | 3.29 (0.59) | 0.78 (0.03) |
| Validation | F | 97.8 (4.7) | 0.94 (0.02) | 1.7 (0.37) | 3.29 (0.59) | 0.86 (0.04) |
| Online | I | 87 (12) | 0.89 (0.03) | 2.95 (0.54) | 4.64 (0.76) | 0.76 (0.07) |
| Online | F | 95.58 (6.7) | 0.93 (0.02) | 1.92 (0.51) | 3.62 (1.1) | 0.85 (0.05) |

[1]Average Perpendicular Distance (APD).
[2]Hausdorff Distance (HD).
[3](I): Initial contour, (F): Final contour.

TABLE 2

Comparison of segmentation performance between our method and state-of-the-art techniques using the MICCAI database (Radau, P. et al. 2009 *MIDAS J Caridac MR Left Ventricle Segm Chall*). Numbers format: mean value (standard deviation).

| Method | #[1] | Good contours % | Dice metric | APD[2] | Conformity |
|---|---|---|---|---|---|
| Proposed | 30 | 96.69 (5.7) | 0.94 (0.02) | 1.81 (0.44) | 0.86 |
| Queiros et al. (2014) | 45 | 92.7 (9.5) | 0.9 (0.05) | 1.76 (0.45) | 0.78 |
| Ngo and Carneiro (2014) | 30 | 93.23 (9.84) | 0.89 (0.03) | 2.26 (0.46) | 0.75 |
| Hu et al. (2013) | 45 | 91.06 (9.4) | 0.89 (0.03) | 2.24 (0.4) | 0.75 |
| Constantinides et al. (2012) | 45 | 80 (16) | 0.86 (0.05) | 2.44 (0.56) | 0.67 |
| Liu et al. (2012) | 45 | 91.17 (8.5) | 0.88 (0.03) | 2.36 (0.39) | 0.73 |
| (Huang et al., 2011) | 45 | 79.2 (19) | 0.89 (0.04) | 2.16 (0.45) | 0.75 |
| Schaerer et al. (2010) | 45 | — | 0.87 (0.04) | 2.97 (0.38) | 0.70 |
| Jolly (2009) | 30 | 95.62 (8.8) | 0.88 (0.04) | 2.26 (0.59) | 0.73 |

[1]Number of datasets evaluated. 30 -validation and online datasets, 45- all datasets.
[2]Average Perpendicular Distance (APD).

Figure 14:
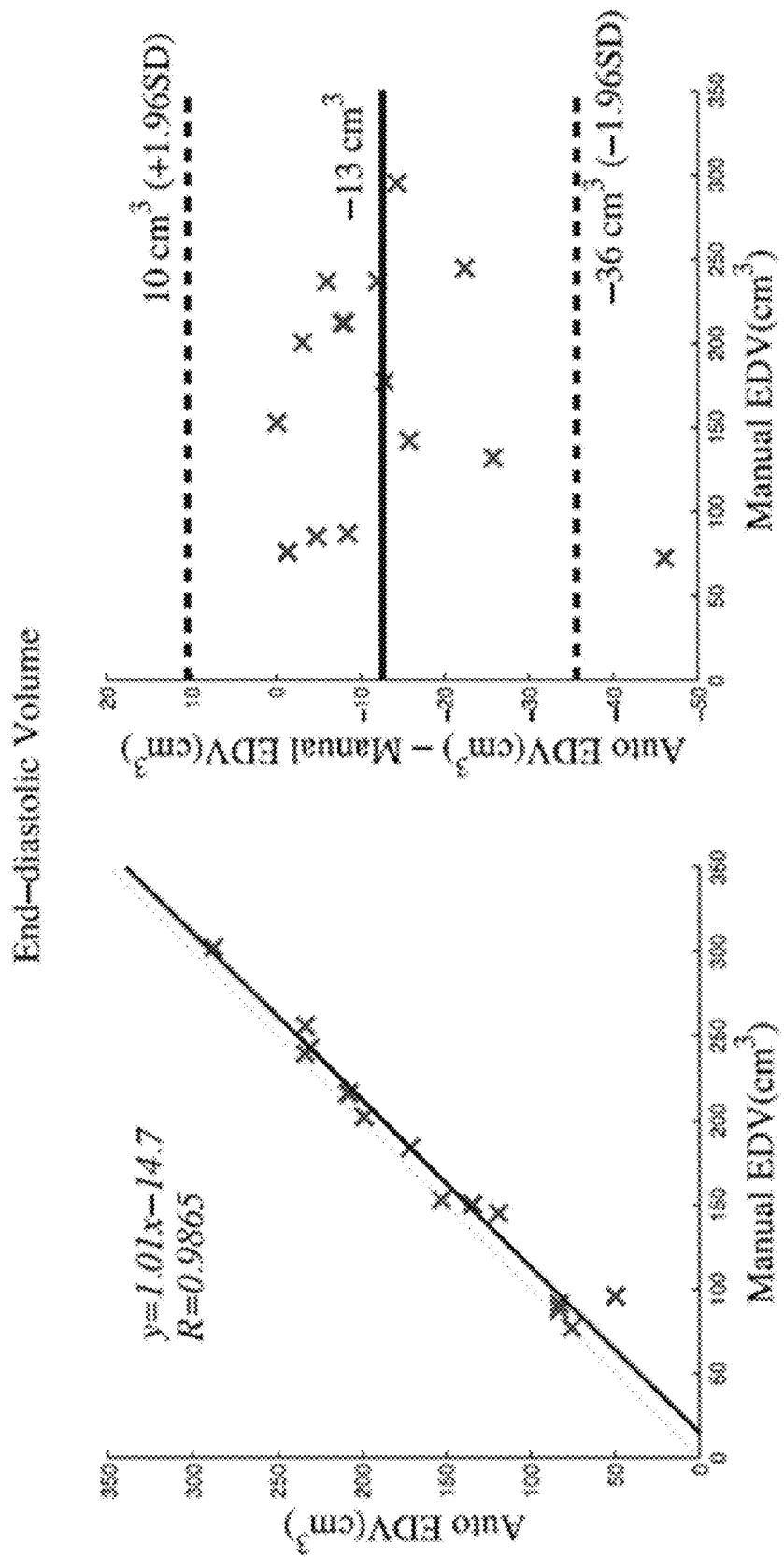
FIG. 14: Correlation graph (left) and Bland-Altman (right) for end-diastolic volume (EDV).
Figure 15:
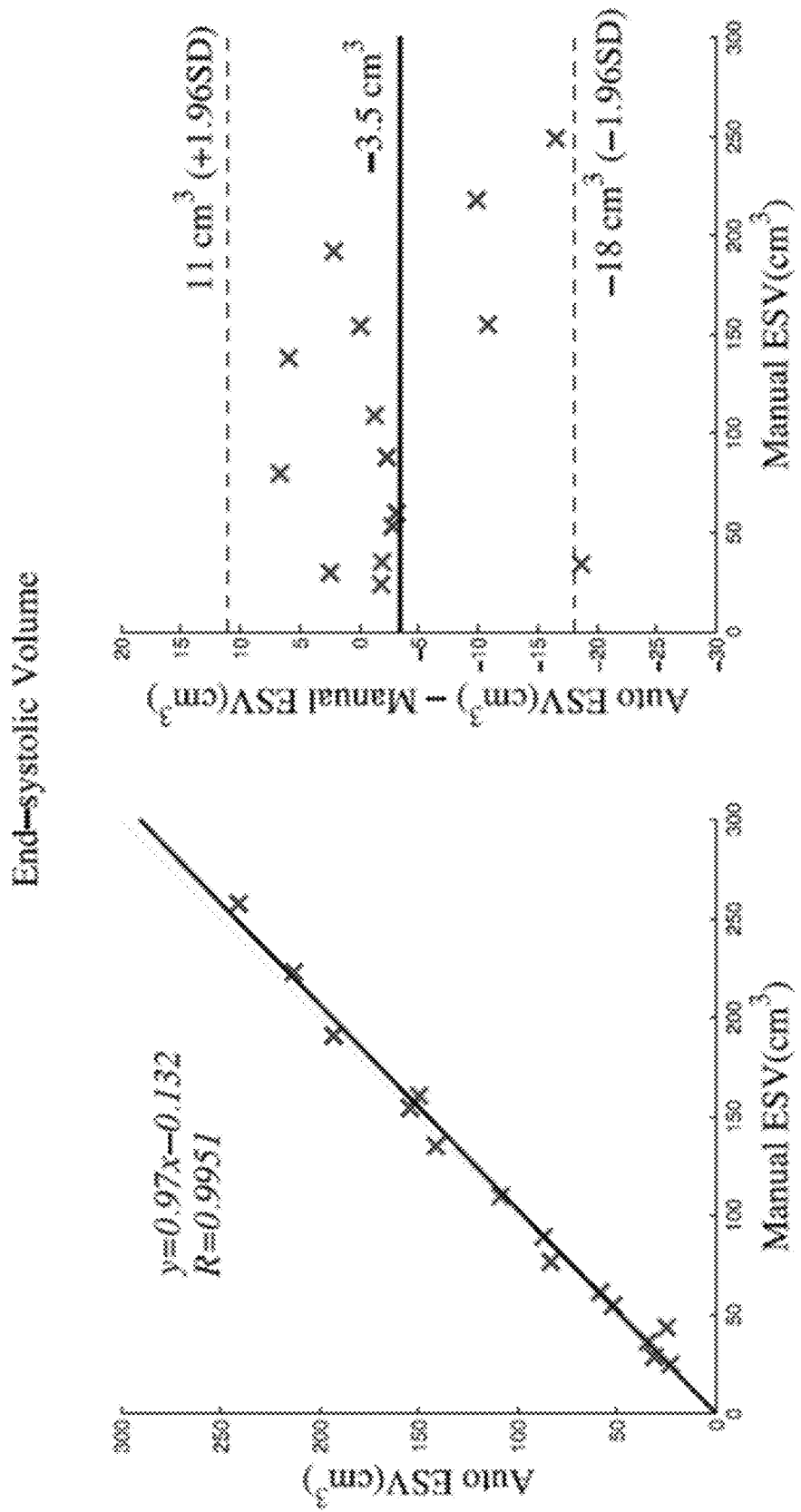
FIG. 15: Correlation graph (left) and Bland-Altman (right) for end-systolic volume (ESV).
Figure 16:
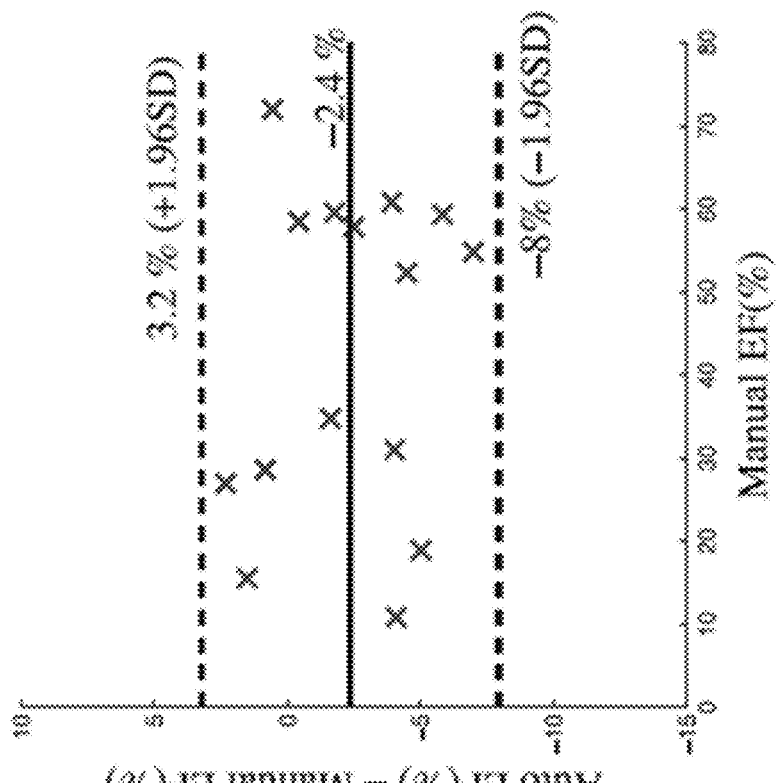
FIG. 16: Correlation graph (left) and Bland-Altman (right) for the ejection fraction (EF).
Figure 16:
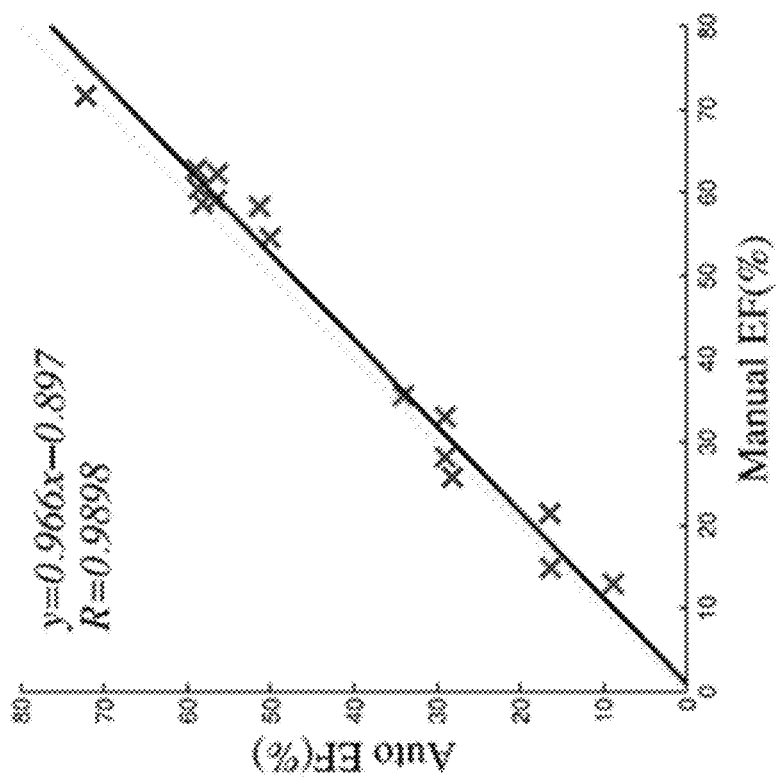

FIGS. 14-16 illustrate the correlation graphs (left) between the automatic and manual results and the Bland-Altman graphs (right) of the differences, using the validation dataset, for EDV, ESV and EF, respectively. A correlation with the ground truth contours of 0.99, 0.99, 0.99 for EDV, ESV and EF was achieved. The level of agreement between the automatic and manual results was represented by the interval of the percentage difference between mean±1.96 SD. The mean and confidence interval of the difference between the automatic and manual EDV results were −13 cm$^3$ and (−36-10 cm$^3$), respectively. The CV and RPC were 6.9% and 13%, respectively. The mean and confidence interval of difference between the automatic and manual ESV results were −3.5 cm$^3$, (−18-11 cm$^3$) and CV=6.9%, RPC=14%. Also, the mean and confidence interval of the difference between the automatic and manual EF results were −2.4%, (−8%-3.2%), CV=6.7%, RPC=13%.

Approximated elapsed times of the training process were as follows. Training autoencoder to obtain filters: 63.3 s, training convolutional network: 3.4 h, training stacked-AE: 34.25 min. Once trained, the elapsed times of the LV segmentation in a typical MR image were as follows: ROI detection (convolution, pooling, and logistic regression): 0.25 s, shape inferring (stacked-AE): 0.002 s, segmentation (deformable model): 0.2 s.

5. Discussion

In this study, we developed and validated an automated LV segmentation method based on deep learning algorithms. We broke down the problem into localization, shape inferring and segmentation tasks. Convolutional networks were chosen for localization and extracting a ROI because they are invariant to spacial translation and changes in scale and pixels' intensity (LeCun, Y. et al. 2010 in *Convolutional networks and applications in vision*. pp. 253-256; Sermanet, P. et al. 2014. "Overfeat: Integrated recognition, localization and detection using convolutional networks." In: Proceedings of International Conference on Learning Representations (ICLR2014)). We also chose a stacked AE for shape inferring because of its simplicity in training and implementation yet showing to be powerful in different vision tasks. Vincent, P. et al. 2010 *J Mach Learn Res* 11: 3371-3408. Ideally, a pure deep learning was desired. However, this was not possible due to several challenges including the limited number of training data. Thus, we integrated deep learning with deformable models to bring more accuracy to the method.

As seen in the left panel of FIG. 10, the outcome of the deformable model without shape constraint (dark gray) leaked to the surrounding areas due to the low contrast at the borders. Clearly this is not acceptable. Alternatively, the deep learning network (shape inference) provided a close contour (gray) to the ground truth (light gray) with no leakage. This is due to the fact that the network has been trained using the ground truth data to look for the overall shape of the LV and not the intensity difference at the border. Finally, the combined deep learning and deformable models brought the contour (white) closer to the ground truth. Similar behavior can be seen in the right panel of FIG. 10 when contours tend to shrink due to presence of papillary muscles in the LV.

From FIGS. 11-13, it can be seen that the LV was accurately segmented from the base to apex. The alignment process resulted in a smooth 3D reconstruction of the LV in FIG. 11. The first image on the left corner of FIG. 11 shows a slight leakage from the ground truth. This situation is one of the challenging cases that, due to the fuzziness of the LV border, contours tend to leak to surrounding areas in pure deformable models. Luckily, by integrating the inferred shape into the deformable models, this leakage was significantly prevented in this image as well as in all similar cases such as the first and second images in the fifth row of FIG. 13. In other challenging cases, such as in FIG. 14, that pure deformable models tend to shrink inward due to the presence of papillary muscles, or leak outward due to low resolution and small contrast of images at the apex; however, our method overcame these short-comings.

Computed metrics in Table 1 showed that the inferred shape provided good initial contours with an overall accuracy of 90% (in terms of DM). Also, the integrated deformable model provided final contours with great agreement with the ground truth with an overall DM of 94% and improvements in other metrics. Table 2 revealed that our method outperformed the state-of-the-art methods and significant improvements were achieved in all metrics. In particular, the DM and conformity were improved by 4% and 0.08 compared to the best DM and conformity reported by Queiros, S. et al. 2014 *Med Image Anal* 18(7): 1115-1131. The correlation analysis in FIGS. 14-16 depicted a high correlation for the three clinical cardiac indices. The high correlation between the automatic and manual references shows the accuracy and clinical applicability of our framework for automatic evaluation of the LV function. Also, the Bland-Altman analysis revealed a better level of agreement compared with that of Queiros, S. et al. 2014 *Med Image Anal* 18(7): 1115-1131. Alternatively, the level of agreement of frameworks of Cordero-Grande, L., et al. 2011 *Med Image Anal* 15(3): 283-301; Eslami, A. et al. 2013 *Med Image Anal* 17(2): 236-253 are slightly better than that of our method, which can be related to the semiautomated property of these methods compared with our fully automatic approach.

The measured elapsed time revealed that the method can be trained within a reasonable time, which can be performed offline. The longest time was needed for the convolutional network, which required convolution of the filters with images. Nevertheless, these times can be even shortened by developing the algorithms into GPU-accelerated computing platforms instead of our current CPU-based platform. In testing, the average time to perform LV segmentation in a typical image was found less than 0.5 s, of which mostly taken by the convolution network and combined deformable model. Yet, the integrated deformable model converges faster than pure deformable models because of the initialization and integration with the inferred shape. Some of the published works provide numbers for the computational time. However, since each method has been developed on a different computing platform, these values may not be reliable for comparison unless all the methods are developed on the same platform.

While 3D methods are becoming the state-of-the-art in many medical image analysis applications, in the present study, we performed 2-dimensional (2D) processing. This choice was due to two known challenges in cardiac MRI that prevents one from direct 3-dimensional (3D) analysis. First, the gap between slices (vertical dimension) in most routine acquisitions is relatively large (around 7-8 mm) and the pixel intensities between the slices cannot be reliably estimated (Petitjean, C. and Dacher, J.-N. 2011 *Med Image Anal* 15(2): 169-184; Tavakoli, V. and Amini, A. A. 2013 *Comput Vis Image Underst* 117(9); 966-989; Petitjean, C. et al. 2015 *Med Image Anal* 19(1): 187-202; Queiros, S. et al. 2014 *Med Image Anal* 18(7): 1115-1131). Second, due to motion artifacts in cardiac MRI, misalignment between slices is common (Barajas, J. et al. 2006, in *First International Workshop on Computer Vision for Intravascular and Intracardiac Imaging*, MICCAI vol. 1, pp. 114-121; Chandler, A. G. et al. 2008 *J Cardiovasc Magn Reson* 10(1): 1-9; Lötjönen, J. et al. 2004. "Correction of movement artifacts from 4-d cardiac short- and long-axis mr data." In: Proceedings of Medical Image Computing and Computer-Assisted Intervention—MICCAI 2004. Springer, pp. 405-412; Zakkaroff, C. et al. 2012 Stack alignment transform for misalignment correction in cardiac mr cine series; Carminati, M. C. et al. 2014 *Comput Biol Med* 46: 42-50; Liew, Y. et al. 2015 *MRI Phys Med Biol* 60(7): 2715). This means that the cavity center is not at the same position in different slices. Some of the existing tools perform an initial 2D segmentation in the middle slice and later apply an alignment process and then convert from the Cartesian to polar coordinate to perform 3D processing (Queiros, S. et al. 2014 *Med Image Anal* 18(7): 1115-1131). Alternatively, atlas-based techniques build a reference 3D model from some training data and then register the new image to the reference model, which limits the accuracy of segmentation to the reference model. Accordingly, different approaches can be adapted for our method if 3D processing is sought. For instance, instead of feeding 2D images in the current method, 3D data can be fed to the deep learning networks and trained for a 3D reconstruction. This would require networks with higher number of nodes and layers. Considering these challenges and additional complexity burdens, performing 3D computation can be studied in future. Nevertheless, cardiac chamber segmentation in clinical practice is mainly used to compute clinical indices such as the volume or ejection fraction and our method is capable of providing these indices with high accuracy while performing 2D processing.

Finally, one of the difficulties in developing deep learning and machine learning approaches for cardiac MRI segmentation is the lack of adequate data for training and validation. Particularly for deep learning networks, access to more data helps reaching a better generalization and reduce the overfitting problem. Currently, there are no analytic approaches to design hyper-parameters (such as number of layers and units, filter size, etc.) in deep learning networks and they are mainly obtained empirically, as we performed in our study.

6. Conclusion

In summary, a novel method for fully automatic LV segmentation from cardiac MRI datasets is presented. The method employs deep learning algorithms for automatic detection and inferring the LV shape. The shape was incorporated into deformable models and brought more robustness and accuracy, particularly for challenging basal and apical slices. The described approach is shown to be accurate and robust compared to the other state-of-the-art methods. Excellent agreement and a high correlation with reference contours are obtained. In contrast with other automated approaches, our method is based on learning several levels of representations, corresponding to a hierarchy of features and does not assume any model or assumption about the image or heart. The feasibility and performance of this segmentation method is successfully demonstrated through computing validation metrics with respect to the gold standard on the MICCAI 2009 database (Radau, P. et al. 2009 *MIDAS J Caridac MR Left Ventricle Segm Chall*). Testing our method on a larger set of clinical data is subject of future research.

EXAMPLE 2

Automatic Segmentation of the Right Ventricle from Cardiac MRI Using a Learning-Based Approach This study accurately segments the right ventricle (RV) from cardiac MRI using a fully automatic learning-based method. The method utilizes deep learning algorithms, i.e., convolutional neural networks and stacked autoencoders, for automatic detection and initial segmentation of the RV chamber. The initial segmentation is then combined with the deformable models to improve the accuracy and robustness of the process. We trained our algorithm using 16 cardiac MRI datasets of the MICCAI 2012 RV Segmentation Challenge database and validated our technique using the rest of the dataset (32 subjects).

Results: An average Dice metric of 82.5% along with an average Hausdorff distance of 7.85 mm were achieved for all the studied subjects. Furthermore, a high correlation and level of agreement with the ground truth contours for end-diastolic volume (0.98), endsystolic volume (0.99) and ejection fraction (0.93) were observed.

Our results show that deep learning algorithms can be effectively employed for automatic segmentation of the RV. Computed quantitative metrics of our method outperformed that of the existing techniques participated in the MICCAI 2012 challenge, as reported by the challenge organizers.

Our major contributions include: (i) designing a fully automatic RV segmentation method for MRI datasets; (ii) employing deep learning algorithms, trained with limited data, for automatic RV localization and initial segmentation; and (iii) incorporating the deep learning output into deformable models to address the shrinkage/leakage problems and reduce the sensitivity to initialization. Finally, a better performance in terms of multiple evaluation metrics and clinical indices was achieved.

Methods

We used the MICCAI 2012 RV segmentation challenge (RVSC) database (C. Petitjean et al. 2015 *Medical Image Analysis* 19(1): 187-202) provided by the LITIS Lab, at the University of Rouen, France. The algorithms were developed in our research centers at UC Irvine. Then, the results were submitted to the LITIS lab for independent evaluations. The cardiac MRI datasets were acquired by a 1.5T Siemens scanner that includes 48 short-axis images of patients with known diagnoses. The database is grouped into three datasets namely: TrainingSet, Test1Set and Test2Set. Each dataset contains 16 image sequences corresponding to 16 patients. Manual delineations of RV at the end-diastole (ED) and end-systole (ES) are included in TrainingSet only. A typical dataset contains 9 images at ED and 7 images at ES from base to apex. Image parameters are summarized as: slice thickness=7 mm, image size=256×216 (or 216×256) pixels with 20 images per cardiac cycle.

Our method requires square inputs; therefore, patches of 216×216 were cropped out of the original images and used during the training and testing procedures. We used images in TrainingSet to train our algorithm. After completion of training, the algorithm was deployed for RV segmentation in Test1Set and Test2Set. The ground truth delineations of Test1Set and Test2Set are not publicly available and the LITIS Lab provided the independent assessment results upon receiving the automatic segmentations.

Algorithm Description

Figure 17:
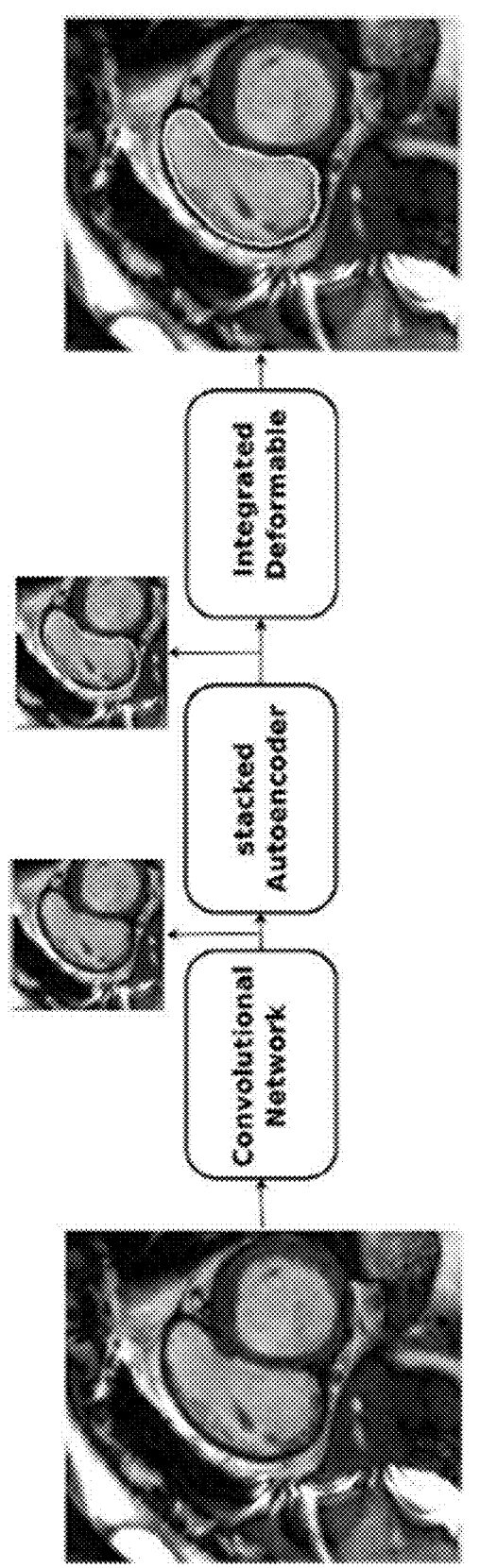
FIG. 17: Block diagram of the integrated deep learning and deformable model algorithm for RV segmentation. 1004×291 mm (600×600 DPI).

The method is carried out over three stages as shown in FIG. 17. The algorithm receives a short-axis cardiac MR image as the input (FIG. 17). First, the ROI containing the RV is determined in the image using a convolutional network trained to locate the RV. Then, the RV is initially segmented using a stacked-AE trained to delineate the RV. The obtained contour is used for initialization and incorporated into deformable models for segmentation. Each stage of the block diagram is individually trained during an offline training process to obtain its optimum values of parameters, as described in our previous publication on LV segmentation (M. R. Avendi et al. 2016 *Medical Image Analysis* 30: 108-119). After training, the system is deployed for automatic segmentation. Here, we have used our developed localization and segmentation algorithms jointly; however, the two can be applied independently. In other words, our segmentation algorithm can work in conjunction with other automatic localization techniques or even without localization. Each step is further explained as follows for completeness of the presentation.

Automatic Localization

The original images in the database have a large field of view, covering the RV chamber as well as parts of the other surrounding organs. In addition, direct handling of the images is not computationally feasible because of the large image size. As such, we first localize the RV and crop out a region of interest from the original images such that the RV chamber is positioned approximately within the center of the images.

Figure 18:
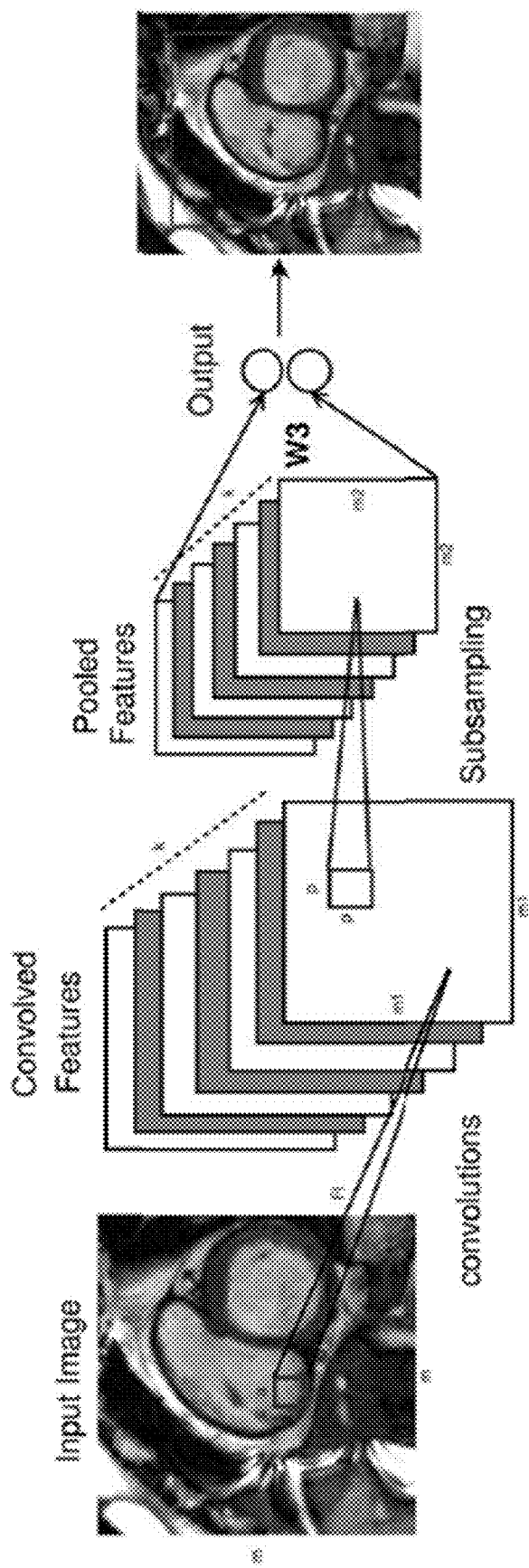
FIG. 18: Block diagram of the convolutional network for automatic localization. 184×62 mm (300×300 DPI).

FIG. 18 shows a block diagram of the automatic RV localization using convolutional networks. We use a down-sampled m×m image as the input to reduce complexity. Let us represent the pixel intensity at coordinate [i,j] by I [i,j]. Throughout the paper, we represent the i-th element of vector x by x[i] and the element at the i-th row and the j-th column of matrix X by X [i,j].

Then, the filters ($F_l \in \mathcal{R}^{a \times a}$, $b_0 \in \mathcal{R}^k$, l=1, . . . , k) are convolved with the input image to obtain k convolved feature maps of size $m_1 \times m_1$, computed as $C_l [i,j]=f(Z_l [i,j])$ where $$Z_l[i, j] = \sum_{k_1=1}^{a} \sum_{k_2=1}^{a} F_l[k_1, k_2] I[i + k_1 - 1, j + k_2 - 1] + b_0[l], \quad (1a)$$

for $1 \le i,j \le m1$, l=1, . . . , k, and $m_1$=m−a+1.

As shown in FIG. 18, the next step in automatic localization is average pooling. The goal of average pooling is to down-sample the convolved feature maps by averaging over p×p non-overlapping regions in the convolved feature maps. This is done by calculating:

$$P_l[i_1, j_1] = \frac{1}{p} \sum_{i=1+(i_1-1)p}^{i_1 p} \sum_{j=1+(j_1-1)p}^{j_1 p} C_l[i, j], \quad (2)$$

for $1 \leq i_1, j_1 \leq m_2$. This results in k reduced-resolution features $P_l \in R^{m_2 \times m_2}$ for l=1, ..., k, where $m_2 = m_1/p$ and p is chosen such that $m_2$ is an integer value. We set m=54, a=10, $m_1$=45, p=5, $m_2$=9, k=100 for an original 216×216 MR image.

The pooled features are finally converted to vector $p \in R^{n_2}$, where $n_2 = km_2^2$, and fully connected to a linear regression layer with two outputs. We train the network to find matrices $W_1 \in R^{2 \times n_2}$ and $b_1 \in R^2$ and compute $y_c = W_1 p + b_1$ at the output layer. Centered at the obtained output, a ROI with size $M_{roi}$ is cropped from the original image to be used for the next stage. The image slices near the RV base require a larger region to cover the whole RV with respect to image slices at the apex. We group the contours into large and small, and set Mroi=171,91 for those, respectively. To optimize the performance of the automatic RV localization, the convolutional network is trained using the backpropagation algorithm (D. E. Rumelhart, 1986 *Nature* 323: 533-536) to obtain the parameter values $F_l$, l=1, ..., k, $b_0$, $W_1$ and $b_1$.

Automatic Initialization

Figure 19:
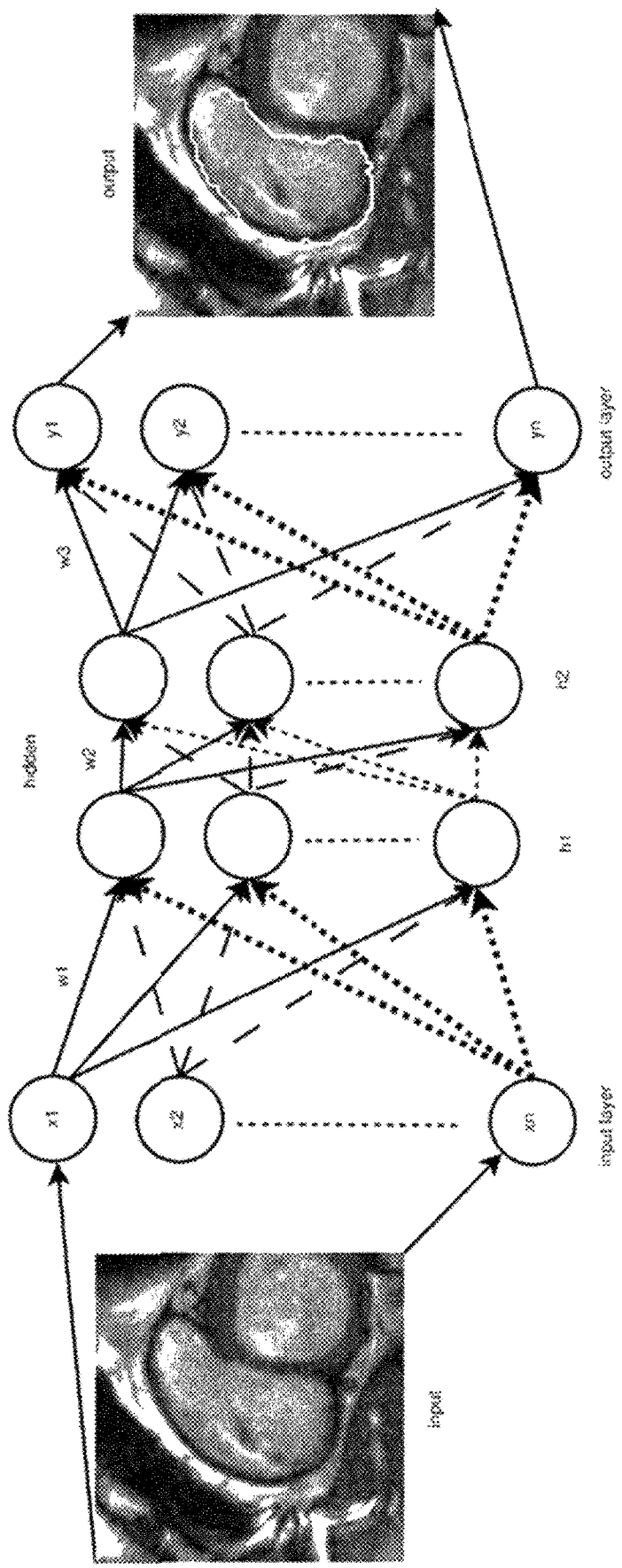
FIG. 19: Block diagram of the stacked-AE for initialization. 194×76 mm (300×300 DPI).

We use a stacked-AE to obtain an initial RV segmentation. As shown in FIG. 19, in addition to the input and output layers, we have two hidden layers in the stacked-AE. The input vector, $x_s \in R^{n_1}$, is constructed by down-sampling and unrolling the sub-image obtained from the automatic localization block. The hidden layers build the abstract representations by computing $h_1 = f(W_2 x_s + b_2)$ and $h_2 = f(W_3 h_1 + b_3)$. The output layer computes $y_s = f(W_4 h_2 + b_4)$ to produce a binary mask. The binary mask is black (zero) everywhere except at the RV borders, and can also be converted to a contour as shown in FIG. 19. Here, $W_2 \in R^{n_2 \times n_1}$, $b_2 \in R^{n_2}$, $W_3 \in R^{n_3 \times n_2}$, $b_3 \in R^{n_3}$ and $W_4 \in R^{n_4 \times n_3}$, $b_4 \in R^{n_4}$ are trainable matrices and vectors that are obtained during the training process. We set the parameters as $n_1$=3249, $n_2$=300, $n_3$=300, $n_4$=3249. The output of this stage has a dual functionality; it is used as the initial contour for the segmentation step as well as a preliminary RV shape.

Figure 20:
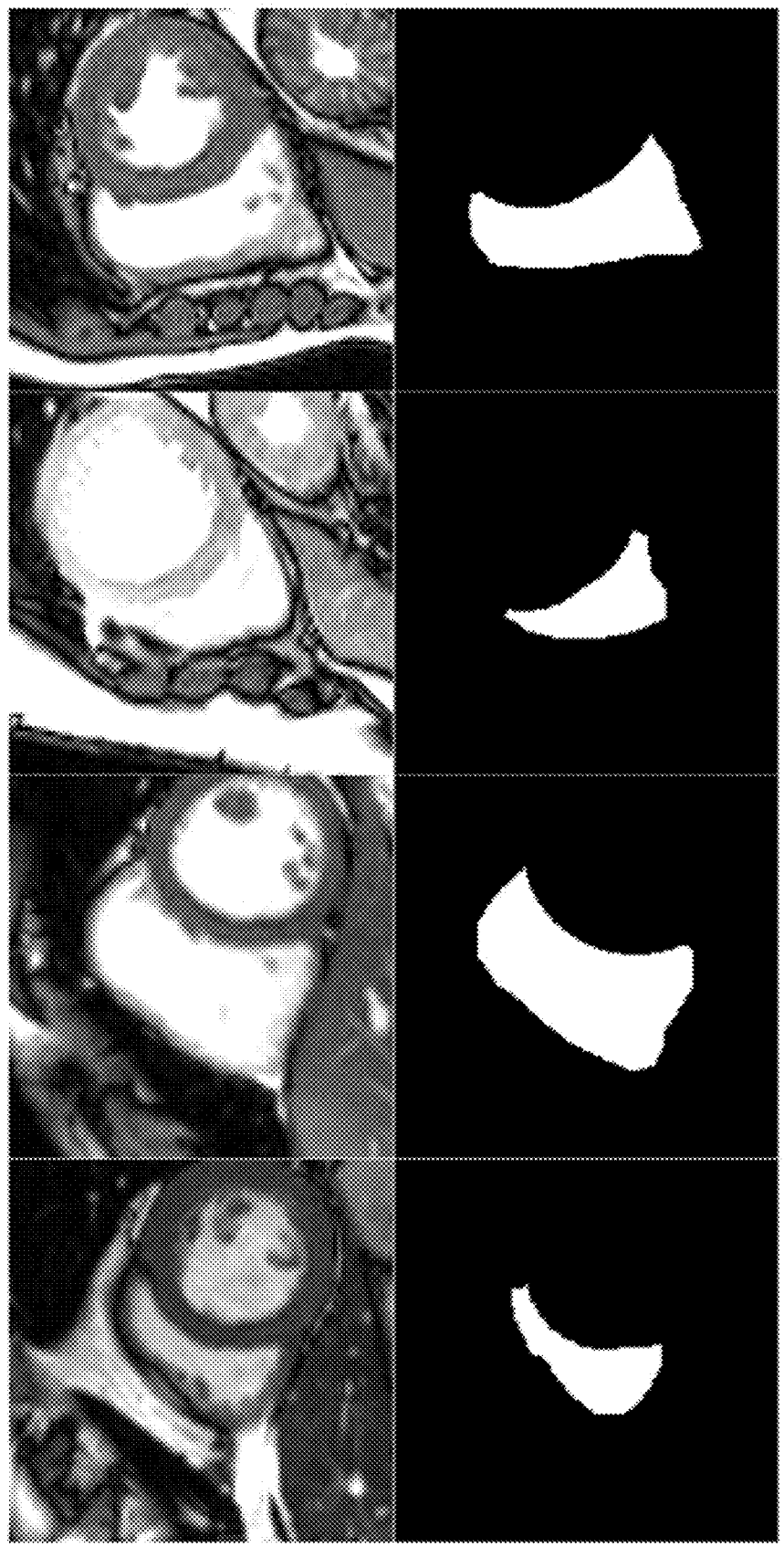
FIG. 20: Four examples of the training data for the stacked-AE, input (upper row) and labels (lower row). 255×128 mm (300×300 DPI).

Training Stacked-AE:

Although, an end-to-end supervised training can be used to train the stacked-AE, it does not lead to a good generalization due to the small size of the training data. For better generalization, we employ an unsupervised layer-wise pre-training followed by an end-to-end supervised fine-tuning. Four typical examples of input images and labels are shown in FIG. 20. The details can be found in (M. R. Avendi et al. 2016 *Medical Image Analysis* 30: 108-119).

RV Segmentation

As shown in FIG. 17, the initial segmentation derived from the previous step is used as a preliminary contour in a deformable model. Deformable models are dynamic contours that eventually lie on the boundary of the object of interest. The evolution of the deformable models is aimed at minimizing an energy function. In conventional deformable methods, contours tend to shrink inward or leak outward because of the fuzziness of the cavity borders and presence of RV trabeculations. These issues are resolved by integrating the preliminary RV shape obtained from the previous stage into the deformable models.

We define the level-set function $\varphi(x,y)$ with negative and positive values for the pixels inside and outside a contour, respectively. We also define the following energy function:

$$E(\varphi) = \alpha_1 E \text{len}(\varphi) + \alpha_2 E \text{reg}(\varphi) + \alpha_3 E \text{shape}(\varphi), \quad (3)$$

which is a combination of the length-based, region-based, and prior shape energy terms. The weights $\alpha_1$, $\alpha_2$, and $\alpha_3$ are the combining parameters, empirically determined as $\alpha_1$=1, $\alpha_2$=0.5, and $\alpha_3$=0.25. The deformable method minimizes the energy function in Eq. (3) to find the following unique contour:

$$\varphi^* = \arg\min_\varphi \{E(\varphi)\}, \quad (4)$$

The solution $\varphi^*$ will lie on the boundary of the object of interest. The optimization problem in Eq. (4) can be solved using the gradient descent algorithm.

Implementation Details

Images of all cases in TrainingSet were collected and divided into the large-contour and small-contour groups, respectively. As such, there are approximately 128 and 75 images of size 256×216 or 216×256 in each group. We also artificially enlarged the training dataset by translation, rotation and changing the pixel intensities of our images based on the standard principal component analysis (PCA) technique explained by Koikkalainen et al. (J. Koikkalainen, et al. 2008 *IEEE Trans Med Imaging* 27(11):1643-1654). Accordingly, we augmented the training dataset by a factor of ten. Augmentation improved the results related to Dice metric (DM) for about 2.5%. Afterwards, we built and trained two networks, one for the large-contour and one for the small-contour dataset.

Over-fitting is a main issue in deep learning networks as many parameters should be learned. A poor performance on the test data is possible despite a well-fitted network to the training data. To overcome this issue, we adopted multiple techniques including artificial enlargement of the training dataset, performing layer-wise pre-training, $l_2$ regularization and sparsity constraints. The use of layer-wise pre-training greatly helped to mitigate the challenge of limited training data. To keep track of the number of parameters, the inputs were down-sampled and only two hidden layers were used in the networks. To monitor the overfitting problem during training, a 4-fold cross-validation was performed. Accordingly, the original training data (16 subjects) was divided into four partitions, with three partitions in training and one partition for validation, in each fold. The average of the four folds is typically considered the final outcome of the model. We used the average of the four folds to predict the performance of the contours in Test1Set and Test2Set.

Our method was developed in MATLAB 2014a, performed on a Dell Precision T7610 workstation, with Intel® Xeon® CPU 2.6 GHz, 32 GB RAM, on a 64-bit Windows 7 platform.

Results

The performance of our methodology was assessed based on comparing the accuracy of the automated segmentation with the ground truth (i.e., manual annotations by experts). TrainingSet of the RVSC database (C. Petitjean et al. 2015 *Medical Image Analysis* 19(1): 187-202) was used for training only, and Test1Set and Test2Set were used for validation. Since, the reference contours of Test1Set and Test2Set are not publicly available, we submitted our automatic segmentation results to the urns Lab for independent evaluation.

Figure 21:
FIG. 21: Endocardial contours of RV at end-diastole from base to apex (P#33 from Test2Set). 158×67 mm (300×300 DPI).
Figure 22:
FIG. 22: Endocardial contours of RV at end-systole from base to apex (P#42 from Test2Set). 186×94 mm (300×300 DPI).

Dice metric and Hausdorff distance were computed (C. Petitjean et al. 2015 *Medical Image Analysis* 19(1): 187-202). Dice metric (DM) is a measure of contour overlap, with a range between zero and one. A higher DM indicates a better match between automated and manual segmentations. Hausdorff distance measures the maximum perpendicular distance between the automatic and manual contours. Table 3 presents the computed DM, HD and correlation coefficient R for RV volumes at the end-diastole and end-systole. Two exemplary segmentations at end-diastole and end-systole are shown in FIGS. 21 and 22, respectively.

TABLE 3

QUANTITATIVE METRICS, MEAN VALUES (STANDARD DEVIATION) OF DICE METRIC (DM) AND HAUSDORFF DISTANCE (HD) AND CORRELATION COEFFICIENT $R^2$ FOR RV VOLUMES.

| Phase | Test1Set | | | Test2Set | | |
|---|---|---|---|---|---|---|
| | DM | HD(mm) | $R^2_{vol}$ | DM | HD (mm) | $R^2_{vol}$ |
| end-diastole (step 2) | 0.82 (0.18) | 12.40 (8.60) | 0.90 | 0.84 (0.80) | 10.10 (6.90) | 0.94 |
| end-diastole (all steps) | 0.86 (0.11) | 7.80 (4.26) | 0.98 | 0.86 (0.10) | 7.85 (4.56) | 0.96 |
| end-systole (step 2) | 0.70 (0.25) | 12.95 (8.70) | 0.92 | 0.74 (0.26) | 10.20 (9.20) | 0.98 |
| end-systole (all steps) | 0.79 (0.16) | 7.51 (3.66) | 0.98 | 0.76 (0.20) | 8.27 (4.23) | 0.98 |

Figure 23:
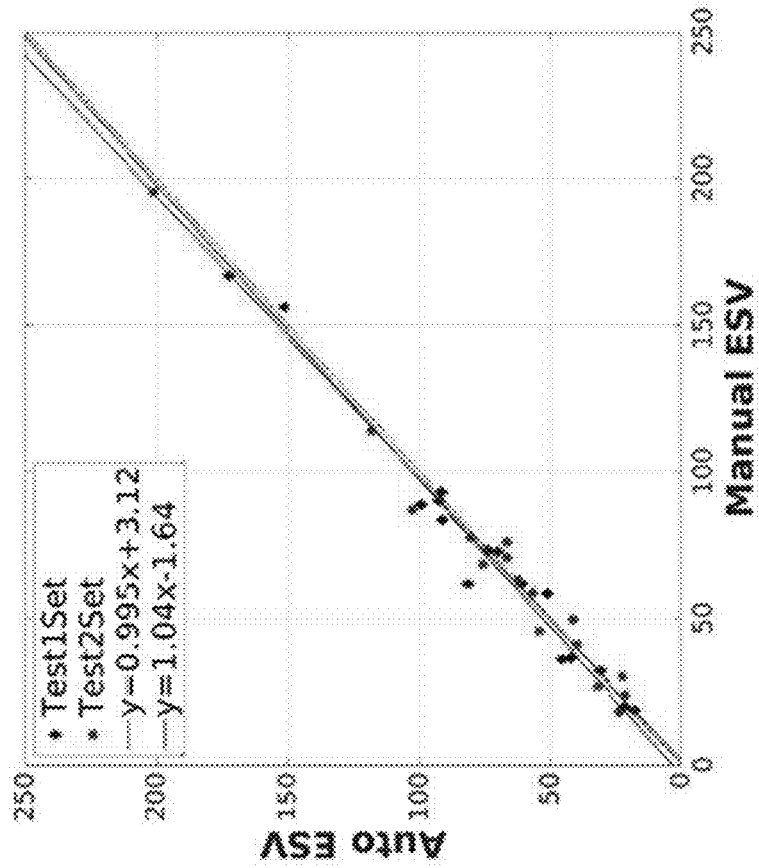
FIG. 23: Correlation plots for EDV, ESV of Test1Set and Test2Set. 646×289 mm (96×96 DPI)
Figure 23:
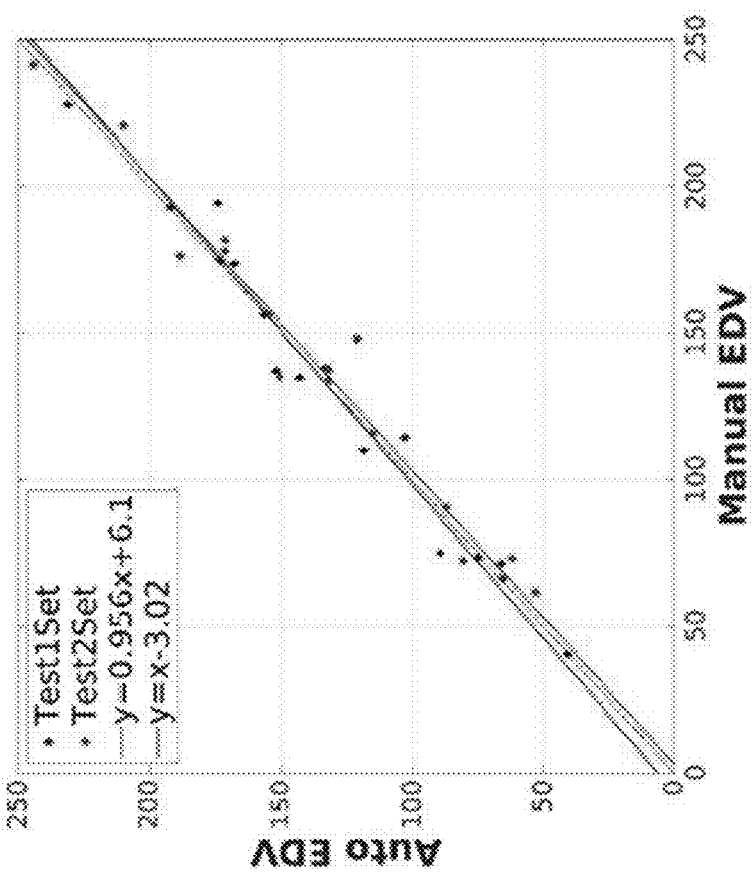
Figure 24:
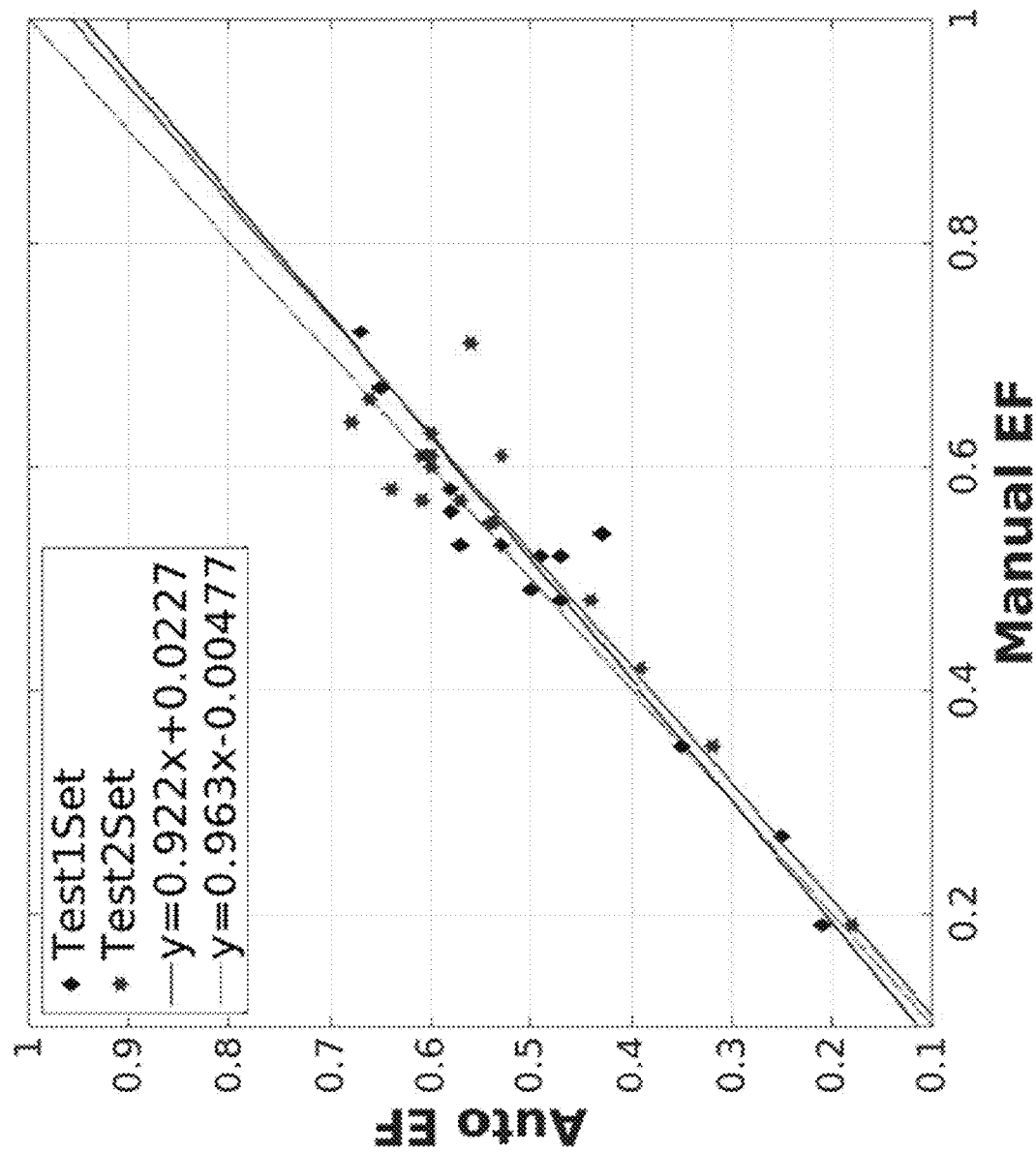
FIG. 24: Correlation plots for ejection fraction of Test1Set and Test2Set. 339×289 mm (96×96 DPI)
Figure 25:
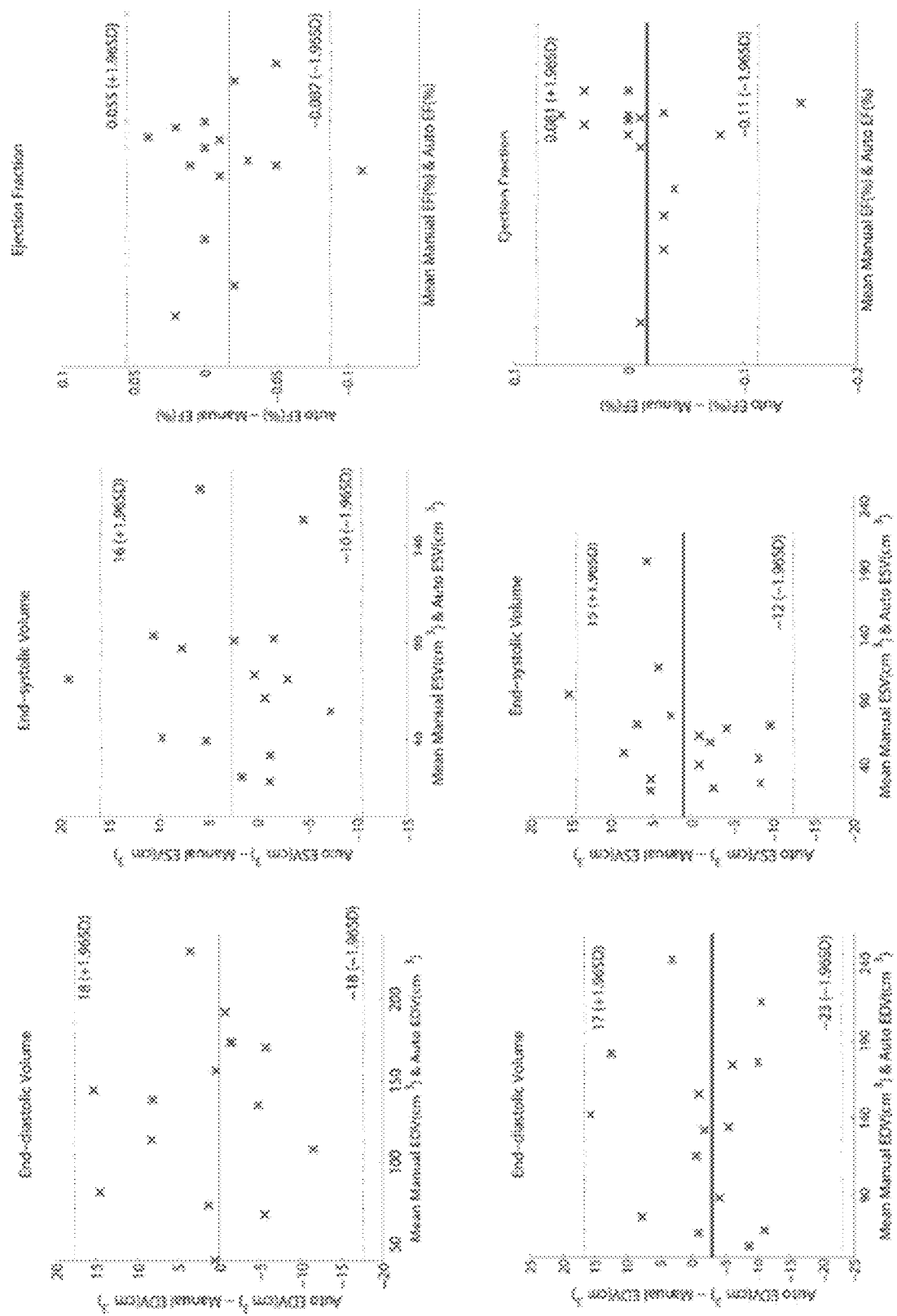
FIG. 25: Bland-Altman plots for EDV, ESV, EF of Test1Set (top row) and Test2Set (bottom row), SD: Standard Deviation.

For clinical validation, end-diastolic volume (EDV), end-systolic volume (ESV) and ejection fraction (EF) were computed. Correlation and Bland-Altman plots were obtained to assess their agreement to the ground truth. Due to limitation in the number of figures, only correlation plots are shown in FIGS. 23-24 and the remaining plots can be found in FIG. 25.

The range of EDV, ESV and EF was (40 mL to 232 mL), (17 mL to 173 mL) and (21% to 67%), in Test1Set and (61 mL to 242 mL), (18 mL to 196 mL), and (19% to 71%) in Test2Set, respectively. The correlation with the ground truth contours of R=0.99, 0.99, 0.96 and R=0.98, 0.99, 0.93 for EDV, ESV and EF were achieved, for Test1Set and Test2Set, respectively. No statistically significant difference in global EDV (Test1Set p=0.96, Test2Set p=0.25), ESV (Test1Set p=0.12, Test2Set p=0.54) and EF (Test1Set p=0.1, Test2Set p=0.22), was observed.

The Bland-Altman analysis showed small biases for EDV (0.11 mL, −3 mL), ESV (0.12 mL, 1.1 mL), and EF (1.6%, 1.6%), in Test1Set and Test2Set, respectively. The level of agreement between the automatic and manual results was represented by the interval of the percentage difference between mean±1.96 standard deviation (SD). The confidence interval of the difference between the automatic and manual was measured as EDV (−18 mL to 18 mL), (−23 mL to 17 mL), ESV (−23 mL to 17 mL), (−12 mL to 15 mL) and EF (−8.7% to 5.5%), (−11% to 8.1%), for Test1Set and Test2Set, respectively. In addition, the coefficient of variation was measured as EDV (6.6%, 7.5%), ESV (9.1%, 10%) and EF (7.4%, 9.1%), for Test1Set and Test2Set, respectively.

Approximate elapsed times for training and test processes were obtained using the tictoc command in MATLAB and were as follows: training convolutional network: 7.8 hours, training stacked-AE: 74 minutes. Once trained, the elapsed times for segmenting the RV in a typical MR image were as follows: ROI detection (convolution, pooling, and regression): 0.25 seconds, initialization (stacked-AE): 0.002 seconds, segmentation (deformable model): 0.2 seconds. The elapsed times during inference is the average of ten tests. Also, the average elapsed time per patient was around 5 seconds assuming 10 image slices per patient at the ES or ED.

Discussion and Conclusions

Currently, the state-of-the-art methods for RV segmentation suffer from several limitations such as leakage and shrinkage of contours due to the fuzziness of the RV borders and presence of trabeculations. Our learning-based method overcame these shortcomings and minimized shrinkage/leakage by integrating the inferred shape into the deformable model. FIGS. 21-22 show that the RV was properly segmented from base to apex. Like many other methods in the literature (C. Petitjean et al. 2015 Medical Image Analysis 19(1): 187-202), the large contours can be more accurately segmented compared to the small contours, and working with image slices in vicinity of the apex particularly at end-systole can be challenging due to the small size and irregular shape.

Computed metrics in Table 3 show that the contours at end-diastole were more accurately segmented in terms of DM compared to the contours at the end-systole, with an overall accuracy of 86% in both testing sets. This is because the contours at enddiastole are larger and easier to segment. Again, this is also a characteristic of other segmentation methods as reported in (C. Petitjean et al. 2015 Medical Image Analysis 19(1): 187-202).

Table 4 summarizes the computed quantitative metrics averaged over ED and ES. As can be seen from the table, our method outperforms the state-of-the-art methods. Considering the work by Ringenberg et al. (J. Ringenberg, et al. 2014 Computerized Medical Imaging and Graphics 38(3): 190-201) as the one generating the closest results to our method, we provide more accurate HD and better standard deviation for both metrics. Mean DM improvements compared to the other methods range from 0-0.28 on Test1Set and 0-0.22 on Test2Set. Ringenberg et al. (J. Ringenberg, et al. 2014 Computerized Medical Imaging and Graphics 38(3): 190-201) demonstrated a mean improvement of 0.01 on Test2Set. Our mean HD improvements range from 1.38-20.77 mm on Test1Set and 0.7-14.18 mm on Test2Set.

TABLE 4

QUANTITATIVE METRICS, MEAN VALUES (STANDARD DEVIATION) OF DICE
METRIC (DM) AND HAUSDORFF DISTANCE (HD) AVERAGE OVER ED AND
ES, FOR OUR METHOD COMPARED TO OTHER TECHNIQUES EVALUATED ON
TEST1SET AND TEST2SET OF MICCAI 2012 RVSC DATABASE (C. Petitjean
et al. 2015 *Medical Image Analysis* 19(1): 187-202).

| Method | A/sA[1] | Test1Set DM | Test1Set HD (mm) | Test2Set DM | Test2Set HD(mm) |
|---|---|---|---|---|---|
| Our Method | A | 83 (0.14) | 7.67 (4.00) | 0.82 (0.16) | 8.03 (4.41) |
| Ringenberg et al. 2014 (22) | A | 0.83 (0.16) | 9.05 (6.98) | 0.83 (0.18) | 8.73 (7.62) |
| Zuluaga et al. 2013 (42) | A | 0.78 (0.23) | 10.51 (9.17) | 0.73 (0.27) | 12.50 (10.95) |
| Wang et al. 2012 (23) | A | 0.57 (0.33) | 28.44 (23.57) | 0.61 (0.34) | 22.20 (21.74) |
| Ou et al. 2012 (16) | A | 0.55 (0.32) | 23.16 (19.86) | 0.61 (0.29) | 15.08 (8.91) |
| Maier et al. 2012 (43) | sA | 0.80 (0.19) | 11.15 (6.62) | 0.77 (0.24) | 9.79 (5.38) |
| Nambakhsh et al. 2013 (44) | sA | 0.59 (0.24) | 20.21 (9.72) | 0.56 (0.24) | 22.21 (9.69) |
| Bai et al. 2013 (17) | sA | 0.78 (0.20) | 9.26 (4.93) | 0.76 (0.23) | 9.77 (5.59) |
| Grosgeorge et al. 2013 (20) | sA | 0.76 (0.20) | 9.97 (5.49) | 0.81 (0.16) | 7.28 (3.58) |

[1]A: Automatic, sA: semi-Automatic

FIGS. 23 and 24 show a high correlation for ESV, EDV and EF (greater than 0.98 for RV volumes), denoting excellent match between the automatic and manual contours. The Bland-Altman analysis revealed negligible biases and a better level of agreement compared with that of the other methods. For example, the Bland-Altman diagrams related to EF showed a bias close to zero with the 95% limits of agreement (±1.96 SD) close to ±0.10. This performance is similar to what reported by Caudron et al. (J. Caudron, et al. 2012 Academic Radiology 19(8): 991-1002) for intra-operator variability values. A non-zero bias with the 95% limits closer to ±0.2 exist for the other methods (C. Petitjean et al. 2015 *Medical Image Analysis* 19(1): 187-202). These observations show the potential clinical applicability of our framework for automatic RV segmentation.

The measured elapsed times show that the method can be trained within a relatively short time and off-line. The first stage, i.e., convolutional network, requires the longest computational time among the three stages. This is because the most time-consuming operation needed is the convolution of the filters with images. Nevertheless, these computational times can be reduced by developing the algorithms into GPU-accelerated computing platforms.

During the test, the average time to perform RV segmentation, in a typical image, was less than 0.5 seconds. Most of the computational time was spent by the convolution network and the integrated deformable model. Yet, the integrated deformable model converges faster than classical deformable models because of the initialization and integration with the inferred shape. Overall, our method needs 5 seconds per patient for the processing. Unfortunately, a fair comparison between computational-time related to different methods was not possible since the other methods have been developed over different platforms. Their reported computational times range from 19 seconds to 30 minutes per patient (C. Petitjean et al. 2015 *Medical Image Analysis* 19(1): 187-202; Y. Ou et al. 2012 "Multi-atlas segmentation of the cardiac mr rightventricle" Proceedings of 3D Cardiovascular Imaging: A MICCAI Segmentation Challenge. Nice, France; W. Bai, et al. 2013 IEEE *Transactions on Medical Imaging* 32(7): 1302-1315; C. Nambakhsh "Rapid automated 3d RVendocardium segmentation in mri via convex relaxation and distribution matching" Proc. MICCAI RV Segmentation Challenge, 2012; D. Grosgeorge et al. *Computer Vision and Image Understanding* 117(9): 1027-1035; O. M. O. Maier, et al. 2012 "Segmentation of RVin 4D cardiac MR volumes using region-merging graph cuts" in *Computing in Cardiology* (CinC), pages 697-700; J. Ringenberg, et al. 2014 *Computerized Medical Imaging and Graphics* 38(3): 190-201; C. Wang, et al. 2012 "A simple and fully automatic right ventricle segmentation method for 4-dimensional cardiac mr images" Proc. of 3D Cardiovascular Imaging: a MICCAI segmentation challenge, 2012; Maria A Zuluaga, et al. 2013 "Multiatlas propagation whole heart segmentation from mri and cta using a local normalised correlation coefficient criterion" In *Functional Imaging and Modeling of the Heart*, pages 174-181. Springer).

As a limitation, the developed method may not perform as efficiently in patients with irregular RV shape, such as congenital heart defects. This is due to the fact that learning-based approaches are as good as their training data. A rich and diverse dataset for training will ensure the performance for various cases. In other words, to efficiently perform on patients with irregular shape RV, the training dataset should include some of those examples.

As discussed in our previous publication (M. R. Avendi et al. 2016 *Medical Image Analysis* 30: 108-119), a difficulty in applying deep learning approaches for cardiac MRI segmentation is the lack of enough data for training and eventually validation. For this work, we used a portion of the MICCAI 2012 RVSC dataset (C. Petitjean et al. 2015 *Medical Image Analysis* 19(1): 187-202) and artificially enlarged that for training. Similar to LV segmentation, currently, no analytic approach exists to design hyper-parameters in deep learning networks and they should be obtained empirically (M. R. Avendi et al. 2016 *Medical Image Analysis* 30: 108-119). Nevertheless, the results indicate that our automated method is accurate. Another limitation of this study is that the validation was performed on a dataset with a rather limited number of subjects and abnormalities. Testing our method on a larger set of clinical data, that currently we do not have access to, is subject of future research.

In prospect, this approach has the potential to be performed across the whole cardiac cycle. The method can also be extended to RV myocardial segmentation to provide additional clinical details. The current RV endocardial segmentation can be used as a pre-processing step to more accurately consider RV trabeculations. Comparison of RV segmentation results with that of LV segmentation, dice metric (94%) and Hausdorff distance (3.45 mm) (M. R. Avendi et al. 2016 *Medical Image Analysis* 30: 108-119), confirmed the difficulty of RV segmentation because of its complex shape variability. Nevertheless, further improvements of these metrics for RV segmentation to reach an accuracy similar to that of LV segmentation should be considered. Furthermore, the method can be considered for simultaneous multiple chamber segmentation by providing training labels that include multiple chambers.

In conclusion, we have developed a novel method for fully automatic RV segmentation from cardiac MRI short-axes. The method employs deep learning algorithms combined with deformable models. It brings more robustness and accuracy, particularly for challenging images with fuzzy borders. In contrast to the other existing automated approaches, our method is based on learning several levels of representations, corresponding to a hierarchy of features and does not assume any model or assumption about the image or heart. The method is simple to implement, and potentially more robust against anatomical variability and image contrast variations. The feasibility and performance of this segmentation method was successfully demonstrated through computing standard metrics and clinical indices with respect to the ground truth on the MICCAI 2012 RVSC dataset (C. Petitjean et al. 2015 *Medical Image Analysis* 19(1): 187-202). Results indicate improvements in terms of accuracy and computational time compared to the existing RV segmentation methods.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Some embodiments have been described in connection with the accompanying drawing. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed embodiments described above. The limitations in the claims are to be interpreted broadly based on the language employed in the claims and not limited to the examples described in the present specification or during the prosecution of the application, which examples are to be construed as non-exclusive.

What is claimed is:

1. A system for automatically segmenting a body chamber from medical images of a patient, the system comprising one or more hardware processors configured to:

obtain medical images comprising at least a representation of the body chamber inside the patient;

obtain a region of interest corresponding to the body chamber from each of the medical images;

organize the obtained region of interest using an input vector;

apply the input vector through a trained graph having at least one hidden layer; and obtain an output vector representing a refined region of interest corresponding to the body chamber based on the application of the input vector through the trained graph, wherein the system is configured to utilize a training data set to initialize filters randomly to train the convolutional network, and wherein the filters are convolved with the input medical images to obtain k convolved feature maps of size $m_1 \times m_1$, computed as:

$$Z_l[i, j] = \sum_{k_1=1}^{a} \sum_{k_2=1}^{a} F_l[k_1, k_2] I[i+k_1-1, j+k_2-1] + b_0[l], \quad (1)$$

for $1 \le i, j \le m_1$, $l=1, \ldots, k$, and $m_1 = m-a+1$; and wherein $p \times p$ non-overlapping regions in the convolved feature maps are computed as:

$$P_l[i_1, j_1] = \frac{1}{p} \sum_{i=1+(i_1-1)p}^{i_1 p} \sum_{j=1+(j_1-1)p}^{j_1 p} C_l[i, j], \quad (2)$$

for $1 \le i_1, j_1 \le m_2$, wherein $m_2 = m_1/p$ and p is chosen such that $m_2$ is an integer value.

2. The system according to claim 1, wherein the one or more hardware processors is/are configured to apply a deformable model on the obtained output vector representing the region of interest.

3. The system according to claim 1, wherein the one or more hardware processors is/are configured to identify and segment a chamber of a heart.

4. The system according to claim 3, wherein the chamber of a heart is selected from the group consisting of a left ventricle, a right ventricle, a left atrium and a right atrium.

5. The system according to claim 1, wherein the medical images comprise magnetic resonance imaging (MRI) images, ultrasound images, or CT scan data.

6. The system according to claim 1, wherein the system comprises one or more elements selected from the group consisting of an operating system, a data input port or reader, an output display device, a keyboard, a transceiver unit, a speaker, and an antenna for wireless communication with other with other devices.

7. The system according to claim 1, wherein the system is linked to an additional computing device and/or a network.

8. The system according to claim 1, wherein the memory comprises one or more of a dynamic random access memory (DRAM), a static random access memory (SRAM), a flash memory, a hard disk drive, a floppy disk drive and a disk-based memory.

9. The system according to claim 1, wherein the system comprises a graphics processing unit (GPU) configured to accelerate computing.

10. A method for automatically segmenting a body chamber from medical images of a patient, the method comprising using the system according to claim 1 to:
obtain image data representing the stack of medical images comprising at least a representation of a body chamber inside the body;
obtain a region of interest using a convolutional network trained to locate the body chamber, wherein the region of interest corresponds to the body chamber from each of the medical images; and
infer a shape of the body chamber using a stacked auto-encoder (AE) network trained to delineate the body chamber, wherein the AE network segments the body chamber.

11. The system according to claim 1, wherein the one or more hardware processors is/are configured to identify a segment of a body chamber from an output of the trained graph.

12. The system according to claim 1, wherein the system is configured to obtain filters using a sparse autoencoder (AE), which acts as a pre-training step.

13. The system according to claim 1, wherein the trained graph has two or more hidden layers.

14. A system for automatically segmenting a body chamber from medical images of a patient, the system comprising one or more hardware processors configured to:
obtain medical images comprising at least a representation of the body chamber inside the patient;
obtain a region of interest corresponding to the body chamber from each of the medical images;
organize the obtained region of interest using an input vector;
apply the input vector through a trained graph having at least one hidden layer; and
obtain an output vector representing a refined region of interest corresponding to the body chamber based on the application of the input vector through the trained graph,
wherein the one or more hardware processors is/are configured to align the medical images of the body chamber by performing contour alignment to reduce misalignment between the short-axis images, and wherein center coordinates of the images are estimated using the following quadratic assumptions for curvature:

$$x_i = a_1 i^2 + b_1 i + c_1, \quad \text{(Equation 17)},$$

$$y_i = a_2 i^2 + b_2 i + c_2 \quad \text{(Equation 18)},$$

wherein $a_1$, $b_1$, $c_1$, $a_2$, $b_2$, $c_2$ are unknown parameters estimated based on minimizing the mean squared error as:

$$\hat{a}_1, \hat{b}_1, \hat{c}_1 = \arg\min_{a_1, b_1, c_1} \sum_{i=1}^{n} (\tilde{x}_i - a_1 i^2 - b_1 i - c_1)^2,$$

$$\hat{a}_2, \hat{b}_2, \hat{c}_2 = \arg\min_{a_2, b_2, c_2} \sum_{i=1}^{n} (\tilde{y}_i - a_2 i^2 - b_2 i - c_2)^2, \text{ and}$$

wherein, after estimating the unknown parameters, the actual center coordinates are estimated from equations (17) and (18), and wherein the contours are registered, using an affine transformation with linear interpolation, according to the estimated center values to obtain an aligned stack of contours.

* * * * *